(12) United States Patent
Guillevic et al.

(10) Patent No.: US 6,834,121 B2
(45) Date of Patent: Dec. 21, 2004

(54) APPARATUS FOR ROUGH CLASSIFICATION OF WORDS, METHOD FOR ROUGH CLASSIFICATION OF WORDS, AND RECORD MEDIUM RECORDING A CONTROL PROGRAM THEREOF

(75) Inventors: Didier Guillevic, Tokyo (JP); Keiji Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 728 days.

(21) Appl. No.: 09/739,661

(22) Filed: Dec. 20, 2000

(65) Prior Publication Data

US 2001/0051965 A1 Dec. 13, 2001

(30) Foreign Application Priority Data

Dec. 22, 1999 (JP) .............................. 11-363744

(51) Int. Cl.[7] ................................. G06K 9/72
(52) U.S. Cl. ..................... 382/224; 382/229; 715/532
(58) Field of Search ............................. 382/176, 177, 382/179, 181, 186, 187, 190, 224, 229, 230, 231, 317; 704/10; 715/531, 532, 533

(56) References Cited

U.S. PATENT DOCUMENTS

| | | | | |
|---|---|---|---|---|
| 6,041,141 A | * | 3/2000 | Yamamoto et al. | ......... 382/231 |
| 6,097,841 A | * | 8/2000 | Gunji et al. | ................. 382/229 |
| 6,219,449 B1 | * | 4/2001 | Nagaishi | ..................... 382/186 |

FOREIGN PATENT DOCUMENTS

| | | |
|---|---|---|
| JP | 7-57059 A | 3/1995 |
| JP | 11-328315 A | 11/1999 |

OTHER PUBLICATIONS

Lee, et al. Efficient postprocessing algorithms for error correction in handwritten Hangul address and human name recognition pp. 232–235, IEEE, 1993.*

Gorgevik, et al. "Word candidate generation in Cyrillic OCR based on ALN classifiers", pp. 870–874, IEEE, 1998.*
Computer Translation of Japanese patent No: 05–135211, pp. 1–13.*
Computer Translation of Japanese patent No: 07–057059, pp. 1–16.*
Computer Translation of Japanese patent No. 11–328315, pp. 1–11.*
Kimura et al., "A Lexicon Directed Algorithm for Recognition of Unconstrained handwritten Words", *IEICE Trans. Inf. & Syst.*, vol. E77–D, No. 7, Jul. 1994, pp. 785–793.
"Moji Ninshiki Gairon" (Character Recognition Summary) (Shinichiro Hashimoto, published by Ohmsha, Mar. 1982, pp. 99–126.
Guillevic et al., "Recognition of Legal Amounts of Bank Cheques", *Pattern Analysis & Applic.*, vol. 1, 1998, pp. 28–41.

* cited by examiner

*Primary Examiner*—Daniel Miriam
(74) *Attorney, Agent, or Firm*—Sughrue Mion, PLLC

(57) ABSTRACT

To provide an apparatus for rough classification of words that allows features of words to be stored in a vocabulary storage division to be generated from character codes of the words so that the words can be efficiently selected. A candidate character selection division 1 detects areas likely to be characters from a word image, and a character recognition division 2 recognizes candidate characters generated in candidate character selection division 1 and converts them into character codes. A number-of-characters estimation division 3 estimates the number of characters of the entire word image and the number of characters of the areas between candidate characters, a word description division 4 generates word description equivalent to a state transition graph from the recognition results of candidate characters and the estimated number of characters of candidate character separations. A vocabulary selection division 5 selects vocabulary that can be checked against word description among the vocabulary stored in vocabulary storage division 6.

35 Claims, 15 Drawing Sheets

(a) Word image (b) Candidate character (c) Recognition results

```
I  M           U
R  H           V
W  U           N
```

(d) Check character

? * {L,R,W} {M,H,U} ? * {U,V,N}

FIG. 3
| No. | Word | Word feature | Selection symbol |
|---|---|---|---|
| 1 | HARMOINEN | | |
| 2 | MERIMASKU | | |
| 3 | KIUKAINEN | | |
| 4 | SÖÖRMARKKU | | |
| 5 | NOORMARKKU | | |
| 6 | URJALAN KARHUKORSU | | |
| 7 | SÄRKIHARJU | | |
| 8 | SOMERHARJU | | |
| 9 | SAIMAANHARJU | | |
| 10 | YLIMARKKU | | |
| 11 | SÖDERUDDEN | | |
| 12 | FURUHOLMEN | | |
| 13 | UIMAHARJU | | |
| 14 | JARHOINEN | | |
| 15 | VUOSTIMOJRV | | |
| 16 | HORMAKUMPU | | |
| ⋮ | ⋮ | | |
FIG. 4
(a) Word image 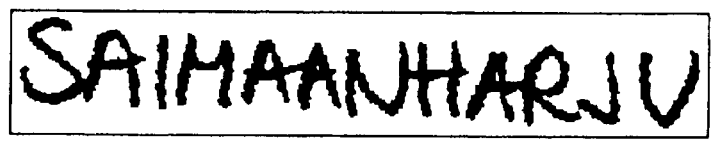
(b) Candidate character 
(c) Recognition results
```
                        I  M                    U
                        R  H                    V
                        W  U                    N
```
(d) Check character
? * {I,R,W} {M,H,U} ? * {U,V,N}

(a) Candidate character (b) Check character (c) State transition graph

| State number | Check character | Number of repetitions | Next state number |
|---|---|---|---|
| S |  | 1 | 1 |
| 1 | * | 2 | 1, 2 |
| 2 | I, R, W | 1 | 3, 4 |
| 3 | Blank | 1 | 4 |
| 4 | M, H, U | 1 | 5 |
| 5 | * | 6 | 5, 6 |
| 6 | U, V, N | 1 | 7, E |
| 7 | Blank | 1 | E |
| E | End of a word |  |  |

*FIG.13*

| Character | Minimum value | Maximum value |
|:---:|:---:|:---:|
| A | 1 | 3 |
| B | 1 | 2 |
| C | 1 | 3 |
| D | 1 | 3 |
| E | 1 | 2 |
| F | 1 | 2 |
| G | 1 | 3 |
| ⋮ | ⋮ | ⋮ |

| State number | Check character | Number of repetitions | Next state number | Graphic feature |
|---|---|---|---|---|
| S |  | 1 | 1 |  |
| 1 | * | 2 | 1, 2 | 1, 2, 3 |
| 2 | I, R, W | 1 | 3, 4 |  |
| 3 | Blank | 1 | 4 | 0, 0, 0 |
| 4 | M, H, U | 1 | 5 |  |
| 5 | * | 6 | 5, 6 | 2, 3, 6 |
| 6 | U, V, N | 1 | 7, E |  |
| 7 | Blank | 1 | E | 0, 0, 0 |
| E | End of a word |  |  |  |

*FIG.18*

| Character | Ascender | Descender | Loop |
|:---:|:---:|:---:|:---:|
| a | 1,0 | 0,0 | 1,0 |
| b | 2,1 | 0,0 | 2,1 |
| c | 0,0 | 0,0 | 1,0 |
| d | 1,1 | 0,0 | 2,0 |
| e | 0,0 | 0,0 | 1,1 |
| f | 2,1 | 2,0 | 3,0 |
| g | 0,0 | 2,1 | 2,1 |
| ⋮ | ⋮ | ⋮ | ⋮ |

APPARATUS FOR ROUGH CLASSIFICATION OF WORDS, METHOD FOR ROUGH CLASSIFICATION OF WORDS, AND RECORD MEDIUM RECORDING A CONTROL PROGRAM THEREOF

BACKGROUND OF THE INVENTION

1. Field of the Invention

The present invention relates to an apparatus for rough classification of words, a method of such of words, and a record medium recording a control program thereof, particularly to a unit for detecting document areas by using a non-contact type image input device such as a camera, in an apparatus for acquiring document images.

2. Description of the Prior Art

Conventionally, there is an apparatus of this type published on pp. 31 to 32 in "Didier Guillevic and C. Y. Suen, 'Recognition of Legal Amounts on Bank Cheques,' Pattern Analysis & Application, Vol.1, No.1, pp. 28–41, 1998."

FIG. 19 shows an example of configuration of the above apparatus for rough classification of words. The exemplary apparatus has a number of devices, which are refered to as divisions throughout the specification and the drawings. This apparatus comprises terminal 101 for inputting a word image, word feature extraction division 7 for extracting features from a word image, vocabulary selection division 8 for comparing word features generated in word feature extraction division 7 with those of all the vocabulary stored in vocabulary storage division 6 to select only the vocabulary of similar word features, and terminal 102 for outputting such vocabulary.

FIG. 2 shows an example of a word image to be inputted in the apparatus for rough classification of words. Word feature extraction division 7 detects from a word image a feature of a loop, and in the case of lowercase characters, the portions jutting downward of "y" and "g" (hereafter referred to as descenders) and the portions jutting upward of "h" and "b" (hereafter referred to as ascenders), extracting alignment of an ascender, a descender and a loop as a feature.

Vocabulary storage division 6 is storing 100,000 kinds of words, for instance, in a table format as shown in FIG. 3. In the example shown in FIG. 3, the words related to place names of a certain country are stored. Each word has its word feature extracted from a word image as well as its text described.

Vocabulary selection division 8 compares a word feature extracted in word feature extraction division 7 with those of all the vocabulary stored in vocabulary storage division 6 to output the word from terminal 102, if determined to be similar.

BRIEF SUMMARY OF THE INVENTION

Object of the Invention

However, as for the above-mentioned conventional apparatus for rough classification of words, while the word features utilized in the word feature extraction division are ascenders, descenders, loops and so on extracted from a word image which can be determined from alphabets making up a word, they are not always extracted in a stable manner depending on a quality of the image.

For instance, a loop cannot be detected in the case of a word not described to correctly close the top of 'O'. In addition, there are cases where a loop that cannot exist is detected because neighboring characters have contacted. Thus, word features may not be completely detected or a feature that cannot exist may be extracted so that correct words cannot be detected as similar words in the vocabulary selection division. If slight deviation of a word feature is allowed in order to prevent omission of detection, many dissimilar words will also be selected resulting in a very large number of words outputted from the apparatus for rough classification of words.

Moreover, to solve the above problem, there is a method of extracting a word feature from a predescribed word image and storing it in the vocabulary storage division. To roughly classify 100,000 words by this method, however, it is necessary to extract features from word images acquired by having 100,000 words described by a very large number of people, and thus it becomes inexecutable.

Therefore, the object of the present invention is to provide an apparatus for rough classification of words solving the above problem and capable of generating a feature of a word stored in the vocabulary storage division from a character code of each word to efficiently select a word, a method of such rough classification of words and a record medium recording a control program thereof.

SUMMARY OF THE INVENTION

An apparatus for rough classification of words according to the present invention is one for inputting a word image and selecting vocabulary similar to it among the vocabulary stored in a vocabulary storage device in advance, having:

a candidate character selecting device for, of the word image, selecting candidate characters that are image areas conforming to predetermined conditions;

a character recognizing device for converting into character codes the image areas selected by the candidate character selecting device;

a word describing device for generating word description representing the word image by using the character codes converted by the character recognizing device; and a vocabulary selecting device for checking the word description generated by the word describing device against the vocabulary recorded in the vocabulary storage device so as to select and output vocabulary that can be consistently checked.

Another apparatus for rough classification of words according to the present invention is one for inputting a word image and selecting vocabulary similar to it among the vocabulary stored in a vocabulary storage device in advance, having:

a candidate character selecting device for, of the word image, selecting candidate characters that are image areas conforming to predetermined conditions;

a character recognizing device for converting into character codes the image areas selected by the candidate character selecting device;

a number-of-characters estimating device for estimating the number of characters of the word image in its entirety and estimating the number of characters in the areas generated from the word image;

a word describing device for generating word description representing the word image by using the character codes converted by the character recognizing device and the number of characters in the areas estimated by the number-of-characters estimating device; and a vocabulary selecting device for selecting vocabulary recorded in the vocabulary storage device by using the estimated number of characters of the word in its entirety and checking the word description against the vocabulary recorded in the vocabulary storage device so as to select and output vocabulary that can be consistently checked.

Another apparatus for rough classification of words according to the present invention is one for inputting a word image and selecting vocabulary similar to it among the vocabulary stored in a vocabulary storage device in advance, having:

- a candidate character selecting device for, of the word image, selecting candidate characters that are image areas conforming to predetermined conditions;
- a character recognizing device for converting into character codes the image areas selected by the candidate character selecting device;
- a number-of-characters estimating device for estimating the number of characters of the word image in its entirety and estimating the number of characters in the areas generated from the entire word image;
- a feature describing device for extracting image features of the word image in its entirety and extracting the image features in the areas generated from the entire word image;
- a word describing device for generating word description representing the word image by using the character codes, the number of characters in the areas and the graphic features in the areas; and
- a vocabulary selecting device for using the estimated number of characters and graphic features of the word in its entirety to select the vocabulary recorded in the vocabulary storage device and checking the word description against the vocabulary recorded in the vocabulary storage device so as to select and output vocabulary that can be consistently checked.

A further apparatus for rough classification of words according to the present invention is one for inputting a word image and selecting vocabulary similar to it among the vocabulary stored in a vocabulary storage device in advance, having:

- a candidate character selecting device for, of the word image, selecting candidate characters that are image areas conforming to predetermined conditions;
- an uppercase/lowercase determining device for determining whether the word image comprises only uppercase characters or a mixture of uppercase and lowercase characters;
- a character recognizing device for, when determined as comprising only the uppercase characters by the uppercase/lowercase determining device, converting into character codes the image areas selected by limiting the character type only to the uppercase, and when determined as the mixture of uppercase and lowercase characters by the device, converting into character codes the image areas selected by targeting all the character types;
- a number-of-characters estimating device for estimating the number of characters of the word image in its entirety and estimating the number of characters in the areas generated from the entire word image;
- a feature describing device for extracting image features of the word image in its entirety and extracting the image features in the areas generated from the entire word image;
- a word describing device for generating word description representing the word image by using the character codes, the number of characters in the areas and the graphic features in the areas; and
- a vocabulary selecting device for using the estimated number of characters and graphic features of the word in its entirety to select the vocabulary recorded in the vocabulary storage device and checking the word description against the vocabulary recorded in the vocabulary storage device so as to select and output vocabulary that can be consistently checked.

A method for rough classification of words according to the present invention is one for inputting a word image and selecting vocabulary similar to it among the vocabulary stored in a vocabulary storage device in advance, comprising the steps of, of the word image, selecting candidate characters that are image areas conforming to predetermined conditions, converting the selected image areas into character codes, generating word description representing the word image by using the converted character codes, and checking the generated word description against the vocabulary recorded in the vocabulary storage device so as to select and output vocabulary that can be consistently checked.

Another method for rough classification of words according to the present invention is one for inputting a word image and selecting vocabulary similar to it among the vocabulary stored in a vocabulary storage device in advance, comprising the steps of, of the word image, selecting candidate characters that are image areas conforming to predetermined conditions, converting the selected image areas into character codes, estimating the number of characters of the word image in its entirety and estimating the number of characters in the areas generated from the word image, generating word description representing the word image by using the converted character codes and the estimated number of characters in the areas, and using the estimated number of characters of the word in its entirety to select the vocabulary recorded in the vocabulary storage device and checking the word description against the vocabulary recorded in the vocabulary storage device so as to select and output vocabulary that can be consistently checked.

Another method for rough classification of words according to the present invention is one for inputting a word image and selecting vocabulary similar to it among the vocabulary stored in a vocabulary storage device in advance, comprising the steps of, of the word image, selecting candidate characters that are image areas conforming to predetermined conditions, converting the selected image areas into character codes, estimating the number of characters of the word image in its entirety and estimating the number of characters in the areas generated from the entire word image, extracting image features of the word image in its entirety and extracting the image features in the areas generated from the entire word image, generating word description representing the word image by using the character codes, the number of characters in the areas and the graphic features in the areas, and using the estimated number of characters and graphic features of the word in its entirety to select the vocabulary recorded in the vocabulary storage device and checking the word description against the vocabulary recorded in the vocabulary storage device so as to select and output vocabulary that can be consistently checked.

A further method for rough classification of words according to the present invention is one for inputting a word image and selecting vocabulary similar to it among the vocabulary stored in a vocabulary storage device in advance, comprising the steps of, of the word image, selecting candidate characters that are image areas conforming to predetermined conditions, determining whether the word image comprises only uppercase characters or a mixture of uppercase and lowercase characters, when determined as comprising only the uppercase characters, converting into character codes the image areas selected by limiting the character type only to the uppercase, and when determined as the mixture of uppercase and lowercase characters, converting into character codes the image areas selected by targeting all the character types, estimating the number of characters of the word image in its entirety and estimating the number of characters in the areas generated from the entire word image, extracting image features of the word image in its entirety and extracting the image features in the areas generated from the entire word image, generating word description representing the word image by using the character codes, the number of characters in the areas and the graphic features in the areas, and using the estimated number of characters and graphic features of the word in its entirety to select the vocabulary recorded in the vocabulary storage device and checking the word description against the vocabulary recorded in the vocabulary storage device so as to select and output vocabulary that can be consistently checked.

A record medium recording a control program for rough classification of words according to the present invention is one recording the control program for controlling an apparatus for rough classification of words for inputting a word image and selecting vocabulary similar to it among the vocabulary stored in a vocabulary storage device in advance, in which the control program causes the apparatus to select, of the word image, candidate characters that are image areas conforming to predetermined conditions, to convert the selected image areas into character codes, to generate word description representing the word image by using the converted character codes, and to check the generated word description against the vocabulary recorded in the vocabulary storage device so as to select and output vocabulary that can be consistently checked.

Another record medium recording a control program for rough classification of words according to the present invention is one recording the control program for controlling an apparatus for rough classification of words for inputting a word image and selecting vocabulary similar to it among the vocabulary stored in a vocabulary storage device in advance, in which the control program causes the apparatus to select, of the word image, candidate characters that are image areas conforming to predetermined conditions, to convert the selected image areas into character codes, to estimate the number of characters of the word image in its entirety and estimate the number of characters in the areas generated from the word image, to generate word description representing the word image by using the converted character codes and the estimated number of characters in the areas, and to use the estimated number of characters of the word in its entirety to select the vocabulary recorded in the vocabulary storage device and to check the word description against the vocabulary recorded in the vocabulary storage device so as to select and output vocabulary that can be consistently checked.

Another record medium recording a control program for rough classification of words according to the present invention is one recording the control program for controlling an apparatus for rough classification of words for inputting a word image and selecting vocabulary similar to it among the vocabulary stored in a vocabulary storage device in advance, in which the control program causes the apparatus to select, of the word image, candidate characters that are image areas conforming to predetermined conditions, to convert the selected image areas into character codes, to estimate the number of characters of the word image in its entirety and estimate the number of characters in the areas generated from the entire word image, to extract image features of the word image in its entirety and extract the image features in the areas generated from the entire word image, to generate word description representing the word image by using the character codes, the number of characters in the areas and the graphic features in the areas, and to use the estimated number of characters and graphic features of the word in its entirety to select the vocabulary recorded in the vocabulary storage device and to check the word description against the vocabulary recorded in the vocabulary storage device so as to select and output vocabulary that can be consistently checked.

A further record medium recording a control program for rough classification of words according to the present invention is one recording the control program for controlling an apparatus for rough classification of words for inputting a word image and selecting vocabulary similar to it among the vocabulary stored in a vocabulary storage device in advance, in which the control program causes the apparatus to select, of the word image, candidate characters that are image areas conforming to predetermined conditions, to determine whether the word image comprises only uppercase characters or a mixture of uppercase and lowercase characters, when determined as comprising only the uppercase characters, to convert into character codes the image areas selected by limiting the character type only to the uppercase, and when determined as the mixture of uppercase and lowercase characters, to convert into character codes the image areas selected by targeting all the character types, to estimate the number of characters of the word image in its entirety and estimate the number of characters in the areas generated from the entire word image, to extract image features of the word image in its entirety and extract image features in the areas generated from the entire word image, to generate word description representing the word image by using the character codes, the number of characters in the areas and the graphic features in the areas, and to use the estimated number of characters and graphic features of the word in its entirety to select the vocabulary recorded in the vocabulary storage device and to check the word description against the vocabulary recorded in the vocabulary storage device so as to select and output vocabulary that can be consistently checked.

More specifically, an apparatus for rough classification of words of the present invention has a candidate character selection division for detecting portions likely to be single characters from a word image, a character recognition division for recognizing selected characters, and a number-of-characters estimation division for estimating, from a word image or part of such an image, the number of characters contained therein, as well as word description division for describing candidate characters from the recognized portions of selected candidate characters and estimated number of characters, and a vocabulary selection division for comparing the described results with character codes of the vocabulary recorded in vocabulary storage division to select similar vocabulary.

Thus, as it is not necessary to extract a word feature from a word image in advance, and also, as opposed to selecting similar words by using only a few characters contained in a word, similar words are selected by utilizing selected characters and their positions in a word, unnecessary similar words are not often selected and it becomes possible to select words efficiently.

BRIEF DESCRIPTION OF THE DRAWINGS

FIG. 3 is a drawing showing an example of a vocabulary table in the vocabulary storage division of FIG. 1;

FIG. 4 is a drawing showing examples of a word image, selected candidate characters and their recognition results and generated check characters;

FIG. 13 is a drawing showing an example of a table storing a range of the estimated number of characters of each individual character code in the number-of-characters range generation division of FIG. 12;

FIG. 18 is a drawing showing an example of a table storing a range of graphic features of each individual character code in the graphic feature range generation division of FIG. 17.

DETAILED DESCRIPTION OF THE PREFERRED EMBODIMENTS

Figures 1, 2:
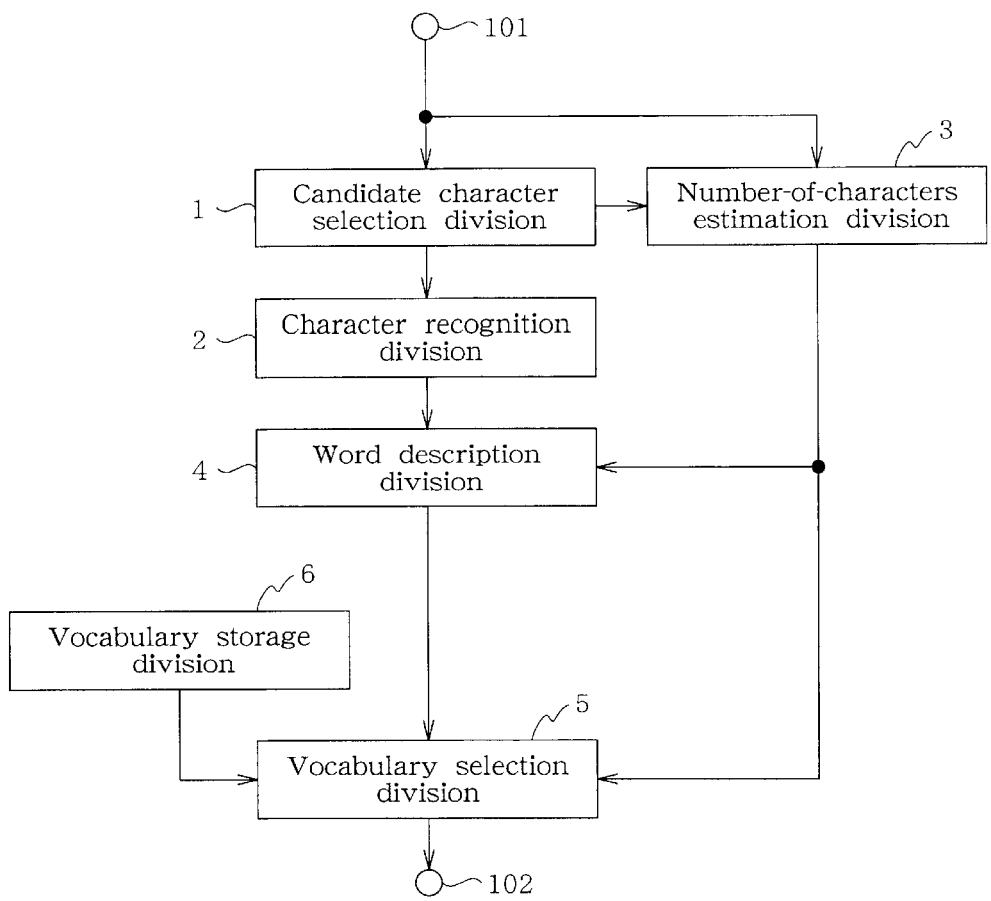
FIG. 1 is a block diagram showing configuration of an apparatus for rough classification of words according to an embodiment of the present invention.
FIG. 2 is a drawing showing an example of a word image to be handled by the apparatus for rough classification of words according to an embodiment of the present invention.

Next, preferred embodiments of the present invention are described by referring to the drawings. FIG. 1 is a block diagram showing configuration according to an embodiment of the present invention. In FIG. 1, an apparatus for rough classification of words according to an embodiment of the present invention comprises input terminal 101, candidate character selection division 1, character recognition division 2, number-of-characters estimation division 3, word description division 4, vocabulary selection division 5, vocabulary storage division 6, and output terminal 102.

A word image inputted from input terminal 101 is transferred to candidate character selection division 1 and number-of-characters estimation division 3. FIG. 2 shows an example of a word image. Candidate character selection division 1 extracts a feature from each local area of a word image and determines whether or not a local area of a word image comprises a single character, according to the feature.

If character selection division 1 determines as comprising a single character, it transfers the local area of the word image to character recognition division 2, which recognizes the character of the portion and transfers a character code of recognition results to word description division 4.

FIG. 2 is a drawing showing an example of a word image handled by an apparatus for rough classification of words according to an embodiment of the present invention, FIG. 3 is a drawing showing an example of a vocabulary table in vocabulary storage division 6 of FIG. 1, and FIG. 4 is a drawing showing examples of a word image, selected candidate characters and their recognition results and generated check characters.

Figures 5, 6:
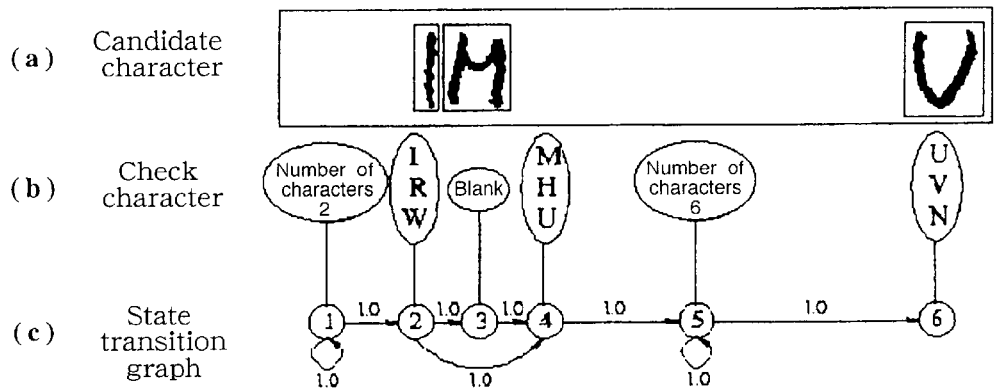
FIG. 5 is a drawing showing examples of candidate characters selected from a word image, check characters generated therefrom, word description generated therefrom and an equivalent state transition graph.
FIG. 6 is a drawing showing an example of word description generated from a word image.

Moreover, FIG. 5 is a drawing showing examples of candidate characters selected from a word image, check characters generated therefrom, word description generated therefrom and an equivalent state transition graph, and FIG. 6 is a drawing showing an example of word description generated from a word image.

Figure 7:
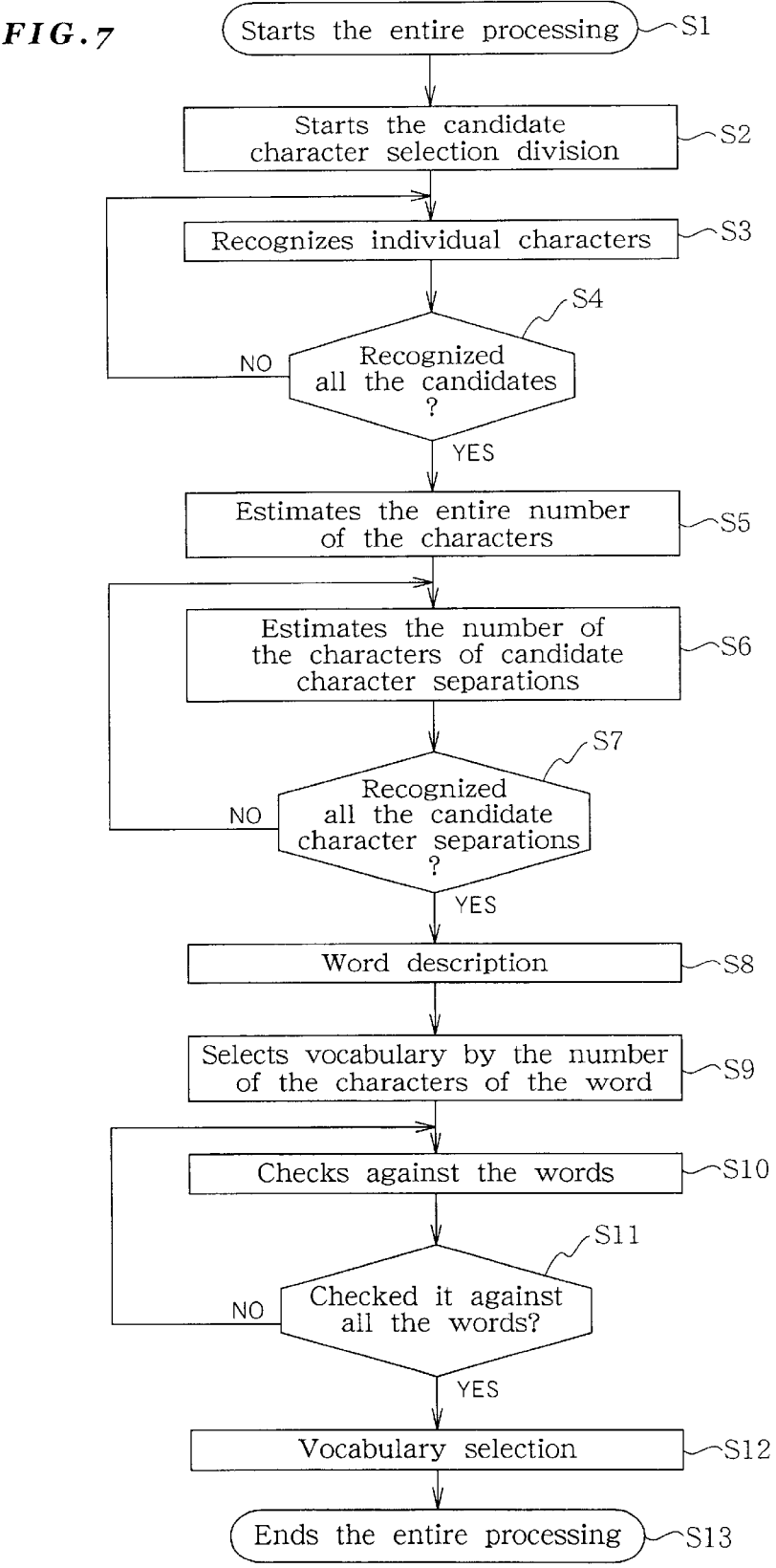
FIG. 7 is a flowchart showing operation of an apparatus for rough classification of words according to an embodiment of the present invention.

Furthermore, FIG. 7 is a flowchart showing operation of an apparatus for rough classification of words according to an embodiment of the present invention. Operation of the apparatus is described by referring to these FIG. 1 to FIG. 7. Moreover, the processing operation shown in FIG. 7 is implemented by executing a program of control memory not illustrated in the divisions of the apparatus, where ROM (read only memory), IC (integrated circuit) memory or the like can be used as control memory.

First, when inputting a word image from input terminal 101, the entire processing of the above apparatus for rough classification of words is started (FIG. 7, step S1), and then the apparatus starts candidate character selection division 102 (FIG. 7, step S2). Here, a word image to be inputted will be one as shown in FIG. 4(a) for instance.

Candidate character selection division 1 detects portions likely to be single characters from a word image and transfers them to character recognition division 2 and number-of-characters estimation division 3. In the example shown in FIG. 4, the examples of candidate characters detected from a word image of FIG. 4(a) are shown in FIG. 4(b). In this example, three candidate characters are selected.

Character recognition division 2 recognizes one by one the candidate characters which are local areas generated by character selection division 1 (FIG. 7, step S3). For instance, in the example shown in FIG. 4, it selects the leftmost candidate character in FIG. 4(b) and performs character recognition. In the example shown in FIG. 4, the results are shown in the recognition results column of FIG. 4(c). In the example of the leftmost character in FIG. 4(b), the three of (I, R, W) are selected as recognition results. The results are transferred from character recognition division 2 to word description division 4.

The apparatus for rough classification of words checks whether or not character recognition division 2 has recognized all of the candidate characters generated by character selection division 1 (FIG. 7, step S4), and if recognition of all the candidate characters is not completed, it returns to step S3 to repeatedly start character recognition division 2.

As only the leftmost character is recognized in the example shown in FIG. 4(b), it then selects the second candidate character from the left and starts character recognition division 2 to generate recognition results (M, H, U) and transfer them to word description division 4. Likewise, in the example shown in FIG. 4(*b*), recognition division 2 is also executed for the third candidate character from left to generate recognition results (U, V, N) and transfer them to word description division 4. Moreover, if the apparatus has completed recognition of all the candidate characters, it proceeds to step S5.

And then, the apparatus for rough classification of words starts number-of-characters estimation division 3, and estimates and acquires the number of characters included in a word image inputted from input terminal 101 (FIG. 7, step S5). Here, it is assumed that the word image was inputted from input terminal 101 in step S1 and transferred to character selection division 1, and simultaneously the same word image was also transferred to number-of-characters estimation division 3. Number-of-characters estimation division 3 acquires the number of characters of the word image, and then transfers the number to vocabulary selection division 5.

Number-of-characters estimation division 3 estimates the number of characters among candidate characters (FIG. 7, step S6). In this case, it first selects the leftmost candidate character and estimates the number of characters included in the local area between the left end of the word image and the left end of the candidate character. In the example shown in FIG. 4, the local area to the left of the leftmost candidate character is a portion comprising "SA" shown in FIG. 4(*a*). Number-of-characters estimation division 3 transfers the number of characters of the estimation results to word description division 4.

The apparatus for rough classification of words checks whether the number of all the characters among the characters were estimated (FIG. 7, step S7), and if all among the characters were not processed, it returns to step S6 and continues to estimate the number of the characters. In the example shown in FIG. 4, after estimating the number of characters to the left of the first candidate character from the left, it successively estimates the number of characters between the first and second candidate characters from the left, the number between the second and third candidate characters, and the number to the right of the third candidate character, and transfers the results to word description division 4.

On completion of estimation of the number of characters among all candidate characters, the apparatus for rough classification of words starts word description division 4 (FIG. 7, step S8). Word description division 4 has estimation results of the number of characters among candidate characters already transferred from number-of-characters estimation division 3 and also has recognition results of the candidate characters already transferred from character recognition division 2. Word description division 4 generates a description of the word image inputted from input terminal 101 based on them.

FIG. 6 shows an example of word description generated from the word image shown in FIG. 4(*a*). The example of word description shown in FIG. 6 represents the state transition graph illustrated in FIG. 5(*c*). The character "*" indicated in the column of check characters shown in FIG. 6 signifies that it can be checked against any character. Numbers listed in the column of number of repetitions show in FIG. 6 can be any character, but it means that a character of an applicable number of repetitions is indicated. For instance, a number of repetitions "2" at the state number "1" shown in FIG. 4 means that an arbitrary character appears twice in a row.

The columns of check characters shown in FIG. 6 store character codes acquired as a result of recognizing candidate characters. A candidate character and a candidate character separation are described as one state respectively, and state numbers are assigned from the left of the positions in a word. In addition, the left end of a word is state "S" and the right end of the word is state "E." Furthermore, a next state number indicates a number of a state capable of transition from one state to a next state. For instance, it is described that, after state number "1," it moves to state number "1" or state number "2."

In the state transition graph shown in FIG. 5, using the circled state numbers, the matters are described by a loop arrow returning from state "1" of (1) to state "1" and a segment arrow heading for state "2." The example shown in FIG. 6 means that the word image shown in FIG. 4 is referred to so that a word having two characters between the left end of the word image and the first candidate character is selected.

Word description division 4 sets initial state "S" and final state "E" of a word, and determines the state from the recognition results of the candidate characters transferred from character recognition division 2. The character separation between the left end of the word and the first candidate character is state "1" and the first candidate character is state "2." Thereafter, the candidate characters are put in order of even numbers from the left such as "2," "4," and "6." Also, the character separations are put in order of odd numbers such as "1," "3, " "5" and "7."

In other words, when the rightmost candidate character is in a state of 2Nth, the state immediately before the final state "E" to the right of it is 2N+1th. However, N is an arbitrary natural number in this case. Moreover, in the column of next state number of each state, a state number which is the number of the state plus "1" is assigned in advance as a next state number. Here, the next state number of initial state "S" is "1," and the next state number of the final state is blank.

Next, word description division 4 assigns check characters to the states. Check characters in a state of representing a candidate character have recognition results transferred from character recognition division 2 assigned. In the example shown in FIG. 6, as state number "2" corresponds to the leftmost candidate character in the example shown in FIG. 4, recognition results (I, R, W) are described as check characters.

Also, the number of repetitions is "1." It means that, if a character is checked once, it proceeds to the next state. Likewise, it determines and describes the check characters and the number of repetitions of state "4" and state "6" in the example shown in FIG. 6. And then, word description division 4 determines the check characters among the characters of state number "1" in the example shown in FIG. 6. State "1" shown in FIG. 6 is equivalent to the character separation on the left side of the first candidate character in the example shown in FIG. 4.

From number-of-characters estimation division 3, the number of characters equivalent to this portion is assumed as "2" and transferred. In this case, the check character of state "1" shown in FIG. 6 is given "*" symbol signifying that it is undefined and can be any character, and its number of repetitions is determined as "2" that is equivalent to the estimated number of characters. Moreover, as the same state is repeated for the estimated number of characters, the state number is added to the next state number, in this case, "1" is added to the next state number of state number "1." Likewise, the check character and the number of repetitions in state "6" are determined and described. Also, "5" is added to the next state number.

As state "3" shown in FIG. 6 has the candidate characters representing state "2" and state "4" before and after it in a row in the original word, no other character will be inserted among them. Therefore, a blank is put in as a check character. However, as it can also be assumed that two characters are in a row without even a blank, it sets a state transition in the case of no blank.

In other words, a number of a next state to the state equivalent to a blank is added to a next state number of a state just preceding the state equivalent to a blank. In the example shown in FIG. 6, as state "3" is equivalent to a blank, "4" is added to the next state number of state "2." It is possible, by following this procedure, to generate word description equivalent to the state transition graph shown in FIG. 5(c) as the example shown in FIG. 6.

The word description generated here is transferred to vocabulary selection division 5, which is started and utilizes the number of characters of the entire word transferred from number-of-characters estimation division 3 to select subject vocabulary among the vocabulary recorded in vocabulary storage division 6 and store them therein (FIG. 7, step S9).

In one embodiment of the present invention, while the configuration in vocabulary storage division 6 has vocabulary recorded in the format shown in FIG. 3 like a conventional apparatus for rough classification of words, it is not essential to the present invention, and vocabulary can be recorded in any format.

Vocabulary selection division 5 reads vocabulary in order from vocabulary storage division 6 and generates maximum and minimum values that the number of characters can take. In the example shown in FIG. 3, it selects the vocabulary of number "1" and checks the number of characters, and acquires maximum value "10" and minimum value "8."

Vocabulary selection division 5 compares the number of characters of the entire word transferred from number-of-characters estimation division 3 with the maximum and minimum values of the number of characters of the vocabulary, and if the number of characters thereof is within the maximum and minimum values, it stores the vocabulary as selected in vocabulary storage division 6. If the number of characters of the entire word is not within the maximum and minimum values of the number of characters of the vocabulary, vocabulary selection division 5 rejects the first vocabulary and does not store it as selected in vocabulary storage division 6. Likewise, vocabulary selection division 5 processes the second vocabulary of vocabulary storage division 6 and thereafter in the same manner as above, and if the number of characters of the entire word is within the maximum and minimum values of the number of characters of the vocabulary, it stores it as selected in vocabulary storage division 6.

Vocabulary selection division 5 sequentially verifies the vocabulary selected and stored in vocabulary storage division 6 as to whether they are the vocabulary corresponding to the word description generated in word description division 4 (FIG. 7, step S10). If corresponding, vocabulary selection division 5 records the vocabulary as selected again in vocabulary storage division 6, and if not corresponding, it erases selection of the vocabulary from vocabulary storage division 6.

Vocabulary selection division 5 checks all the vocabulary stored as selected by vocabulary storage division 6 as to whether they correspond to the word description (FIG. 7, step S11), and if corresponding to all of them, it returns to step S10 and checks other vocabulary selected and stored in vocabulary storage division 6 against the word description. If checks of all the vocabulary selected and stored in vocabulary storage division 6 against the word description are completed, vocabulary selection division 5 outputs from output terminal 102 the vocabulary recorded as selected in vocabulary storage division 6 as vocabulary resulting from rough classification (FIG. 7, step S12).

The word checking operation in vocabulary selection division 5 is described by using FIG. 3 and FIG. 5. A concrete storage format for the state transition graph shown in FIG. 5(c) is the table of word description shown in FIG. 6. The vocabulary to be checked is given to the state transition graph in order from the first character thereof, and if a match with a check character occurs, the state proceeds according to it.

First, a case of checking "HARMOINEN" of number "1" in FIG. 3 is described. If the first character "H" is given from initial state "S" to the state transition graph, the check character of state "1" is an arbitrary character and the state shifts to number 1. And then, if the second character "A" is checked against the state transition graph, it does not match with the check character of state "2" and corresponds only to an arbitrary character of state "1," so the state remains at number 1.

Furthermore, if the third character "R" is checked, it matches with one of the check characters of state "2," so the state is shifted from "1" to "2." At this time, the number of repetitions in state "1" is recorded as "2." In addition, as it also matches with an arbitrary character that is a check character of state "1," it leaves a possibility of remaining in state "1." Moreover, if the fourth character "M" is checked, of the next state numbers of state "2," it matches with the check character of state "4" so that it shifts to state "4." And in the case of remaining in state "1," it corresponds to an arbitrary character again so that it remains in state "1" again.

And then, if the fifth character is checked, it is "O" and acquires "5" that is the next state number of state "4," and as state "5" can check an arbitrary character, it proceeds to state "5." If it remains in state "1," there is no character for proceeding to state "2" until the sixth "I." If the sixth "I" is checked, a case of proceeding to state "2" and a case of further remaining in state "1" are assumed. In the case of remaining in state "1," it cannot proceed to state "2" even by checking the remaining seventh to ninth characters and cannot reach final state "E," so a check subject to this possibility is rejected.

If it proceeds to state "2" with the sixth character "I," a check character of state "3" or state "4" that is a next state number of state "2" is not checked against the seventh character of the vocabulary, so this possibility is also rejected. If it proceed to state "5" by checking the fifth character "O," the following sixth character does not match with a check character of state "6" that is one of the next states of state "5" but it matches with an arbitrary character that is a check character of state "5," namely another next state, so it remains in state The next, seventh character "N" matches with the check character of state "6" that is one of the next states of state "5," so it has a possibility of shifting to state "6." However, while it certainly shifts to final state "E" that is the next state of state "6," the check character of final state "E" is a symbol signifying "end of a word" not matching with the eighth character "E" so that this possibility is also rejected.

In state "5" that is another destination of shifting from state "5" in the case of inputting the seventh character, it remains in state "5" even if the eighth character "E" is checked. If the final character "N" is checked, as it matches with the check character of state "6," it proceeds to state "6" and is checked against a symbol signifying "end of a word" that is the check character of "E" and shifts to final state "E."

In this case, as it reached final state "E" with no character left unchecked, the vocabulary has been checked against the word description. In the case of checking the final character, the possibility of remaining in state "5" is rejected since final state "E" was not reached by checking the final character.

In short, in the example of the first vocabulary shown in FIG. 3, only one possibility is checked against the word description. In this case, the character code string checked in state "1" is "AR," and the character code string checked in state "5" is "OINE."

Vocabulary selection division 5 acquires the maximum and minimum values of the estimated number of characters from character code string "AR." If the maximum value is "3" and the minimum value is "2" is this case, the number of repetitions of state "1" shown in FIG. 6 is within the range.

Likewise, vocabulary selection division 5 acquires the maximum and minimum values of the estimated value of the number of characters of character code string "OINE." If these are "5" and "4," the number of repetitions of state "5" shown in FIG. 6 is "6," which is not within the range. Therefore, the possibility of checking is rejected in the number of repetitions.

Consequently, as all the possibilities of checking were rejected, it determines that the first vocabulary shown in FIG. 3 will not be checked against the word description and does not record it as selected in vocabulary storage division 6. Likewise, if all the vocabulary recorded as selected in vocabulary storage division 6 are checked against the word description and checked against the state transition graph, and then the estimated number of characters can be advocated, it records the vocabulary as selected in vocabulary storage division 6 as one checked against the word description.

Figure 8:
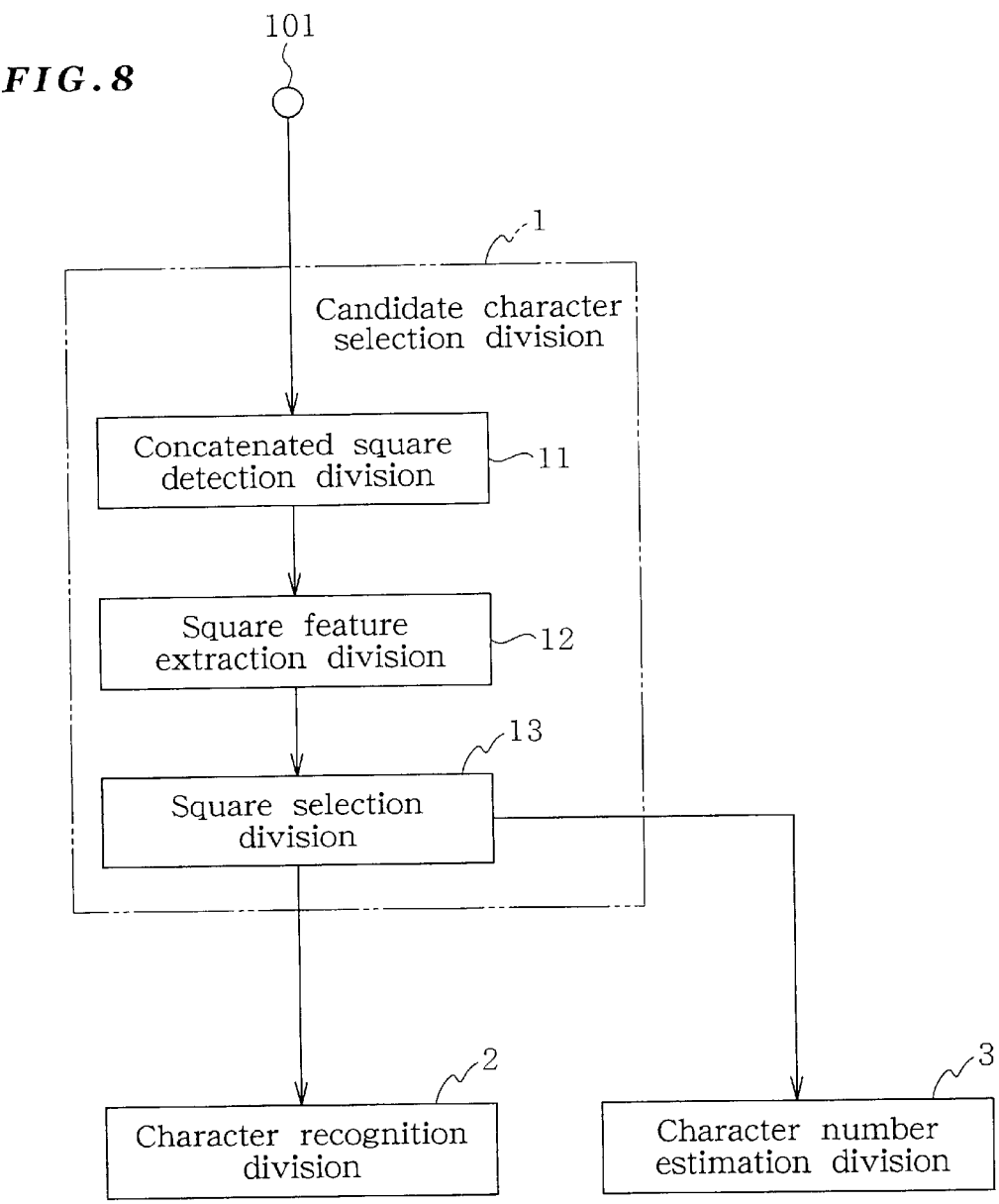
FIG. 8 is a block diagram showing detailed configuration of candidate character selection division of FIG. 1.

FIG. 8 is a block diagram showing detailed configuration of candidate character selection division 1. In FIG. 8, candidate character selection division 1 comprises concatenated square detection division 11, square feature extraction division 12 and square selection division 13.

A word image inputted from input terminal 101, once inputted in candidate character selection division 1, is stored in concatenated square detection division 11. An example of a word image is shown in FIG. 4(a). The image is a binary image, and the pixels in it are either black or white pixels. In terms of a numeric value, it is explained that a black pixel takes a value of "1" and a white pixel takes a value of "O." However, it is not an essential matter.

Concatenated square detection division 11 gives the same label value to the pixels of which neighboring pixel values are both "1" to generate a new image. Initially, it gives different label values only to all the black pixels but does not give any label value to the white pixels.

In concatenated square detection division 11, if pixel coordinates are (x, y) and the pixel value is I (x, y) and the pixel value of the pixel in a label image is L (x, y), a new label value is acquired by the following expression when the condition that I (x, y)=I (x+i, y+j)=1, and i is one of −1, 0 or 1, and j is one of −1, 0 or 1, and neither i nor j is 0 holds.

$$L(x, y)=Min(L(x, y), L(x+i, y+j))\ L(x+i, y+j)=Min(L(x, y), L(x+i, y+j)) \quad (1)$$

However, in this case, Min (u, v) is a function that repeats the smaller value of u and v.

Concatenated square detection division 11 executes calculation of expression (1) for all the pixels repeatedly until the label value no longer changes. A label image thus acquired will have the same label value for a group of black pixels having black pixels as neighboring pixels. A group of black pixels having the same label value is called a concatenated area, and a minimum square surrounding the concatenated area is called a concatenated square. Assuming that K pieces of concatenated square were acquired in concatenated square detection division 11, the k-th concatenated square is represented by coordinate (x (k, 1), y (k, 1)) at its upper left and coordinate (x (k, 2), y (k, 2)) at its lower right.

Concatenated square detection division 11 rearranges all the concatenated squares in increasing order of x (k, 1), namely the x coordinate at the upper left thereof, and numbers the concatenated squares. K pieces of concatenated area corresponding to the consequently generated K pieces of concatenated square are transferred to square feature extraction division 12 by concatenated square detection division 11.

Square feature extraction division 12 extracts features of concatenated areas from lower left coordinates, lower right coordinates and concatenated areas of the K pieces of concatenated square inputted. Feature quantity A (k) is calculated from (x (k, 1), y (k, 1)) and (x (k, 2), y (k, 2)) that is the data of the k-th concatenated square according to the expression of A $$(k)=(y(k, 2)-y(k, 1))/(x(k, 2)/x(k, 1)) \quad (2).$$

Also, feature quantity B (k) is calculated assuming the number of black pixels comprised in the k-th concatenated area as B' (k) according to the expression of B $$(k)=B'(k)/(y(k, 2)-y(k, 1))/(x(k, 2)-x(k, 1)) \quad (3).$$

Square feature extraction division 12 acquires the above-mentioned feature quantities A (k) and B (k) for all k's and transfers them to square selection division 13. While this embodiment describes an example of extracting two kinds of features of A (k) and B (k) in square feature extraction division 12, it is not limited to the two features mentioned since the same effect as above can be acquired by extracting and using the number of vertical lines or the number and positions of closed white areas in the concatenated area.

Square selection division 13 selects squares by using K sets of feature quantities (A (k), B (k)) (provided that k is a natural number from 1 to K) transferred from square feature extraction division 12. To select a square, it checks, for instance, whether it meets the condition of the expression of $$(A(k)-C)**2+D\times B(k)>\text{the first threshold} \quad (4).$$

Here, x**2 represents square calculation of x. Moreover, while C is 1, D is 1, and the first threshold is 0.3 in this embodiment, these values are not essential and may be any values. In addition, expression (4) is an embodiment for the purpose of checking whether the condition is met by using a plurality of feature quantities, and so it may be any method that performs determination.

Square selection division 13 checks expression (4) for K sets of feature quantities in order from the first set, and if the k-th set of feature quantities meets the condition of expression (4), it transfers the k-th concatenated area to character recognition division 2. Simultaneously, Square selection division 13 also transfers the upper left coordinate and lower right coordinate of the k-th concatenated square to number-of-characters estimation division 3. Candidate character selection division 1 performs the above check of all of the K sets of feature quantities and then stops.

Character recognition division 2 can be implemented by using one of the many methods of character recognition listed on pp.99 to 126 of "Moji Ninshiki Gairon" (Character recognition summary) (Shinichiro Hashimoto, published by Ohmsha, March, 1982).

As for the K pieces of candidate character transferred from candidate character selection division 1, character recognition division 2 selects E pieces of the character code acquired as a result of recognizing individual candidate characters and transfers them to word description division 4. While E is 3 in this embodiment, it may be any value. If E is 3, it recognizes K' pieces of candidate character and then transfers K'×3 pieces of character code to word description division 4. When transferring the character code to word description division 4, character recognition division 2 also transfers K', the number of candidate characters, to the word description division 4.

Figure 9:
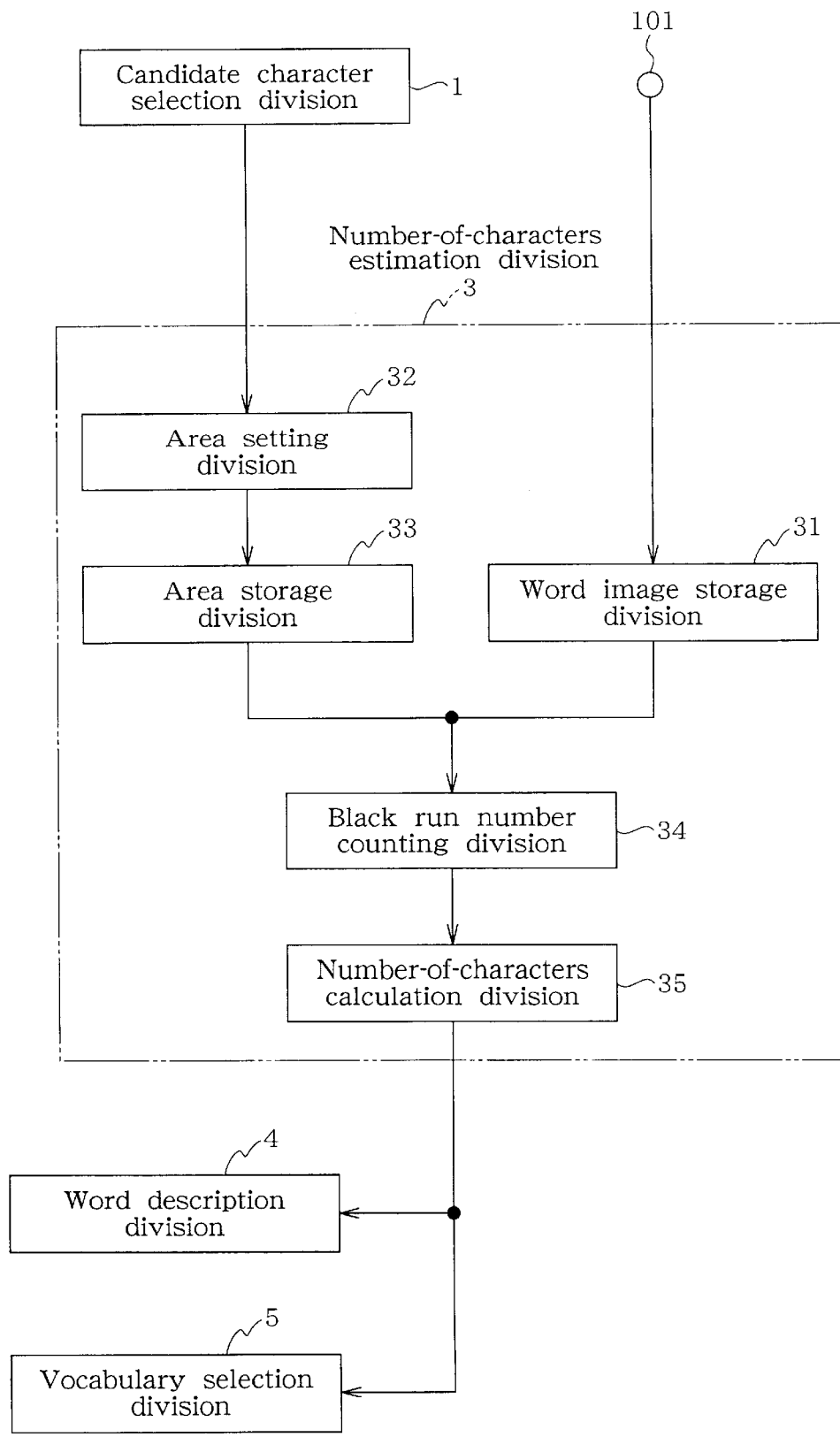
FIG. 9 is a block diagram showing detailed configuration of the number-of-characters estimation division of FIG. 1.

FIG. 9 is a block diagram showing detailed configuration of number-of-characters estimation division 3 in FIG. 1. In FIG. 9, number-of-characters estimation division 3 comprises word image storage division 31, area setting division 32, area storage division 33, black run number counting division 34 and number-of-characters calculation division 35.

A word image inputted from input terminal 101 is stored in word image storage division 31. In estimation of the number of entire characters of step S5 in FIG. 7, the upper left coordinates and lower right coordinates of the entire word images are recorded in area storage division 33. In estimation of the number of characters among candidate characters of step S5 in FIG. 7, area setting division 32 is started and determines the local areas of which number of characters should be estimated from the upper left coordinates and lower right coordinates of candidate characters sequentially transferred from candidate character selection division 1, which are transferred to and recorded in area storage division 33.

On receipt of an upper left coordinate and a lower right coordinate of the first candidate character from character selection division 1, area setting division 32 sets the left end of a local area as the left end of a word image, and the right end of the local area as the left end of a candidate character. On receipt of the k-th character that is the second or thereafter, area setting division 32 sets the left end of the k-th local area as the right end of the k−1-th candidate character, and the right end of it as the left end of the k-th candidate character.

After the data of the last, K'-th candidate character is transferred from candidate character selection division 1, area setting division 32 sets the left end of the k'+1-th local area as the right end of the k'-th candidate character, and the right end of the k'+1-th local area as the right end of the word image, which are stored in area storage division 33.

Black run number counting division 34 sequentially reads the left and right ends of an area from area storage division 33 to detect and count the number of black runs in the area. The upper left coordinate of the word image is an origin (0, 0) and the lower right coordinate thereof is (X, Y), and the leftmost x coordinate of the subject area is X1 and the rightmost x coordinate is X2. In the case of estimating the number of characters of the entire word, X1 is 0 and X2 is X. Also, black run number counting division 34 represents the pixel value of the (X, Y) coordinate by taking the word image as I (X, Y).

Black run number counting division 34 fixes the y coordinate value at V, and checks a pixel value I (x, V) by changing x from X1 to X2. In this case, a series of pixel values 1 appearing sequentially is called a black run. A black run starts when a pixel value changes from 0 to 1, and one black run continues as long as 1 continues, and the black run ends when the pixel value changes from 1 to 0.

Black run number counting division 34 counts how often this black run appears. For instance, if consecutive pixel values are (0, 0, 1, 1, 1, 0, 0, 1, 1, 1, 1, 0), the black run number is "2." A black run number acquired by scanning pixels of which y coordinate is V from X1 to X2 of x coordinates is F (V). While it is implemented in this embodiment so that black run numbers are acquired as to the three different Vs, namely Y/4, Y/2 and 3Y/4 in black run number counting division 34 and then transferred to number-of-characters calculation division 35, this is not an essential matter and any number of different Vs may be used.

Number-of-characters calculation division 35 calculates and acquires an average of a plurality of black runs transferred from black run number counting division 34, and further multiplies the value by coefficient G to determine an estimated number of characters. While the value of G is 0.56 in this embodiment, it may be any other value. Moreover, while this embodiment is implemented by defining the estimate of the number of characters as a single value, it is also possible to determine as an estimate of the number of characters a set of the maximum and minimum values of a plurality of black run numbers transferred from black run number counting division 34 or to take a set of a maximum value of a black run number multiplied by G and a minimum value of a black run number multiplied by G as an estimate of the number of characters. Number-of-characters calculation division 35 transfers the calculated and acquired estimate of the number of characters to word description division 4 and vocabulary selection division 5.

Figure 10:
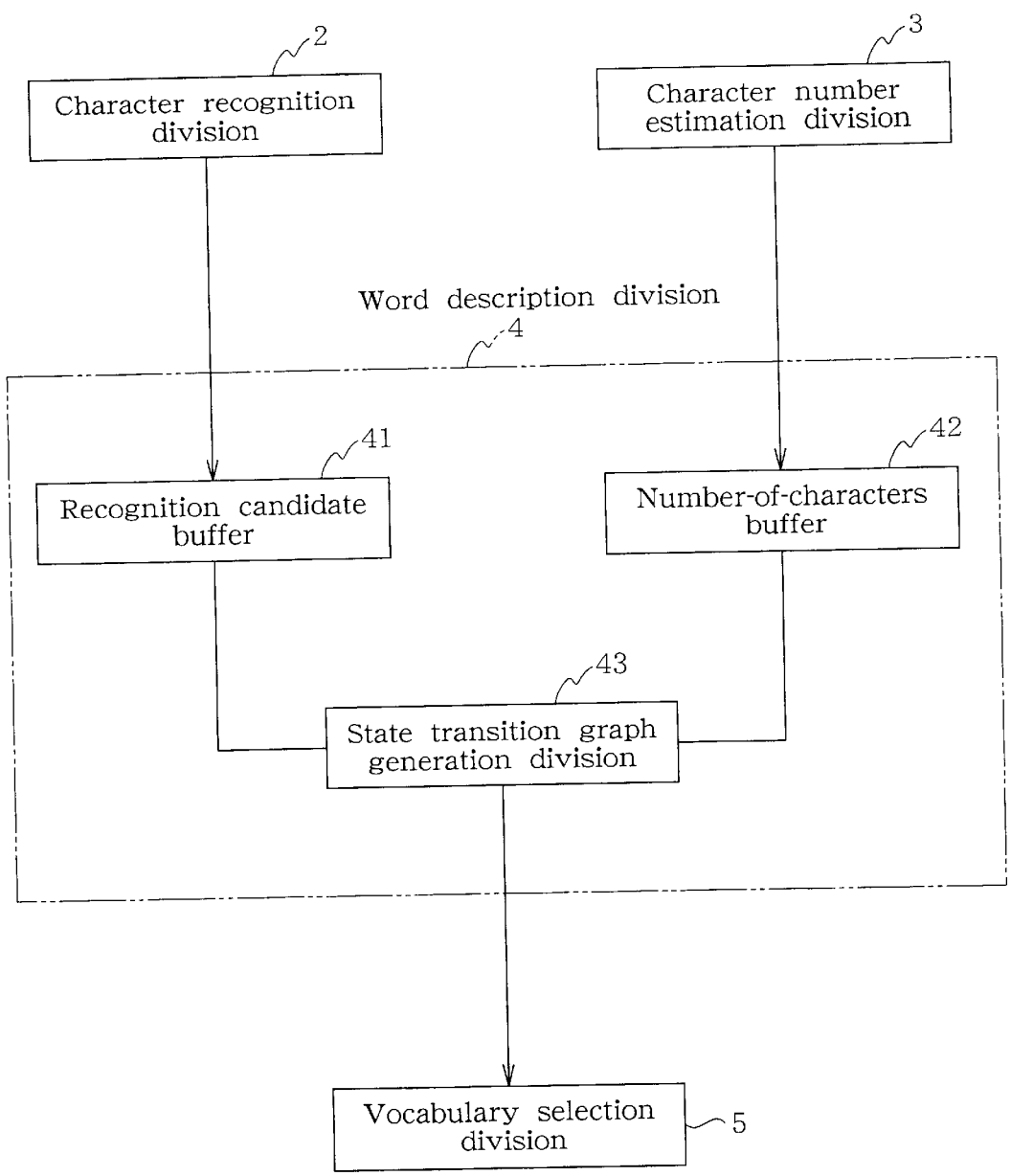
FIG. 10 is a block diagram showing detailed configuration of the word description division of FIG. 1.

FIG. 10 is a block diagram showing detailed configuration of word description division 4. In FIG. 10, word description division 4 comprises recognition candidate buffer 41, number-of-characters buffer 42 and state transition graph generation division 43.

As character recognition division 2 recognizes K' pieces of candidate character and transfers a plurality of character codes for each individual candidate character to word description division 4, word description division 4 records them in recognition candidate buffer 41. Simultaneously, word description division 4 also receives the number of candidate characters K', which is recorded in recognition candidate buffer 41.

Moreover, as number-of-characters estimation division 3 calculates estimates of the number of characters among K'+1 pieces of characters and transfers them to word description division 4, where they are recorded in number of-characters buffer 42. Once they are recorded, word description division 4 starts state transition graph generation division 43 to generate word description such as examples shown in FIG. 6.

Figure 11:
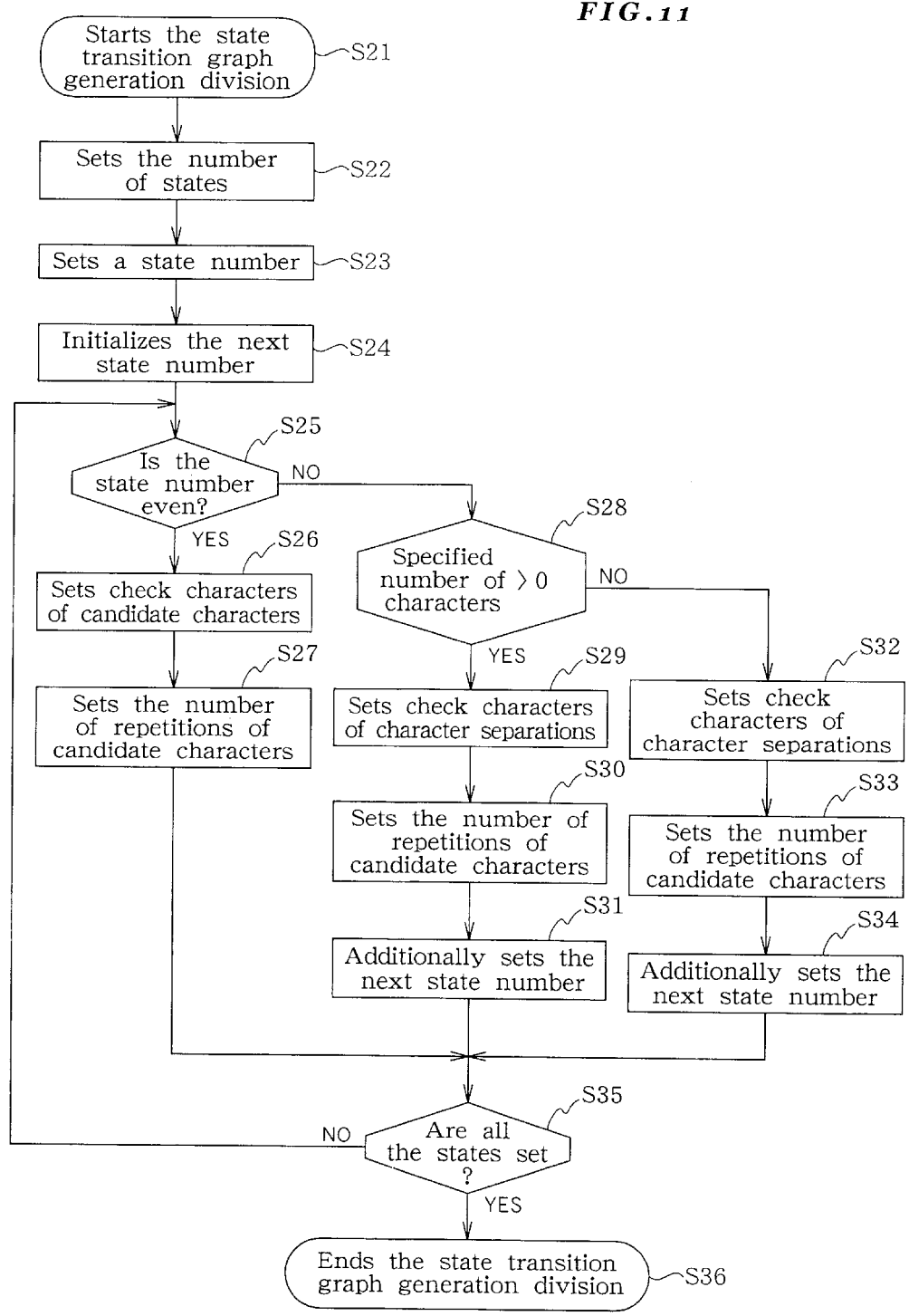
FIG. 11 is a flowchart showing operation of the state transition graph generation division of FIG. 10.

FIG. 11 is a flowchart showing operation of state transition graph generation division 43 of FIG. 10. Operation of state transition graph generation division 43 is described by using these FIG. 10 and FIG. 11. Moreover, the processing operation shown in FIG. 11 is implemented by executing a program of control memory not illustrated in state transition graph generation division 43, where ROM or IC memory can be used for the control memory.

Once started (FIG. 11, step 21), state transition graph generation division 43 sets the number of states at 2×K'+3 from the number of candidate characters K' recorded in recognition candidate buffer 41 (FIG. 11, step S22).

And then, state transition graph generation division 43 sets state numbers to word description (FIG. 11, step S23). In this case, the first state number is "S" and the last state number is "E," where natural numbers increased by one each are assigned in order from "1" to the states following state number "S."

Next, state transition graph generation division 43 initializes the next state number (FIG. 11, step S24). It takes the next state number of state "S" as "1" and assigns nothing to the next state number of state "E." In addition, to state numbers "1" to "2K'," it assigns values that are the state numbers with "1" added as the next state numbers of the states. Furthermore, "E" is assigned to the next state number of state number "2K'+1." Also in the explanation hereafter, state number "S" is the same as state number "0," and state number "E" is the same as state number "2K'+2."

State transition graph generation division 43 sequentially sets check characters and the numbers of repetitions as to state number "1" to state number "2K'+1," and also makes additional modifications to the next state numbers (FIG. 11, step S25 to S35). More specifically, state transition graph generation division 43 determines whether or not a state number is an even number (FIG. 11, step S25), and if it is an even number, then it performs steps S26 and S27 to proceed to step S35, and if it is an odd number, then it performs from step S28 to step S34 to proceed to step S35.

If the state number is "2k" in step S25, state transition graph generation division 43 proceeds to step 26 since the state number is an even number, and reads a set of character codes of recognition results of the k-th candidate character from recognition candidate buffer 41 to take them as check characters of state number "2k," which are stored in word description. However, in the case of final state "E" of which state number is "2k+2," it records a symbol indicating "end of a word" as a check character. And then, state transition graph generation division 43 proceeds to step 27 and sets "1" as the number of repetitions of state number "2k." If the state number is "2k–1" that is an odd number in step S25, state transition graph generation division 43 proceeds to step 28 and reads the estimated number of characters between the k-th characters from number-of-characters buffer 42, and if that number is larger than "0," it performs from step S29 to steps S31 to proceed to step S35. If the estimated number of characters of the k-th character separation is "0," state transition graph generation division 43 performs from step S32 to steps S34 to proceed to step S35.

If the estimated number of characters in the state is larger than "0," state transition graph generation division 43 sets a symbol "*" as a check character of the character separation, signifying that it can be checked against any character. In step S30, state transition graph generation division 43 sets, as the number of repetitions of the state, the estimated number of characters of the k-th character separation read from number-of-characters buffer 42, and in step 31, it adds the number of the state to the next state number of the state and proceeds to step S35 .

In step S28, if the estimated number of characters of the k-th character separation read from number-of-characters buffer 42 is "0" in 2k–1-th state, state transition graph generation division 43 proceeds to step S32 to set a symbol indicating a blank as the check character of the state.

In step S33, state transition graph generation division 43 sets "1" as the number of repetitions of candidate characters, and in step 34, it additionally sets "2k+2" to a state just preceding the state, namely the next state number of the 2k-th state. Thereafter, state transition graph generation division 43 proceeds to step S35.

In step S35, if state transition graph generation division 43 determines that settings of all the states are completed, it proceeds to step S36 and stops. If settings of all the states are not completed, state transition graph generation division 43 returns to step S25 and continues settings of the unset states.

Figure 12:
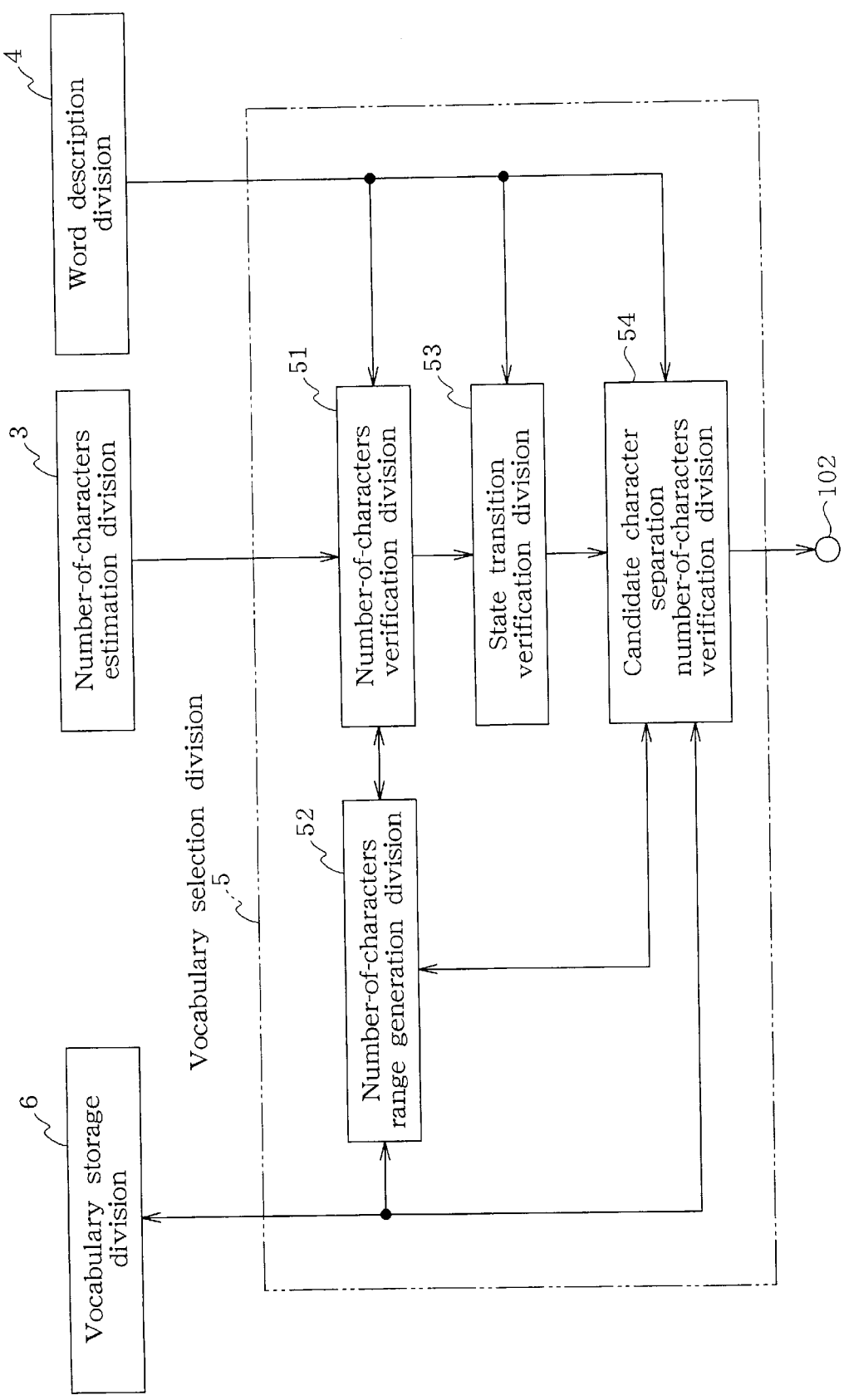
FIG. 12 is a block diagram showing detailed configuration of the vocabulary selection division of FIG. 1.

FIG. 12 is a block diagram showing detailed configuration of vocabulary selection division 5, and FIG. 13 is a drawing showing an example of a table storing a range of the estimated number of characters of each individual character code in the number-of-characters range generation division in FIG. 12. In FIG. 12, vocabulary selection division 5 comprises number-of-characters verification division 51, number-of-characters range generation division 52, state transition verification division 53 and candidate character separation number-of-characters verification division 54.

If the estimated number of characters of the entire word image is transferred from number-of-characters estimation division 3, vocabulary selection division 5 stores the number in number-of-characters verification division 51 and sequentially reads vocabulary one by one from vocabulary storage division 6 to verify that the number of characters of each individual vocabulary is consistent with the estimated number of characters. For instance, the following explains a case where the vocabulary is stored in vocabulary storage division 6 in the format shown in FIG. 3. Immediately after startup, vocabulary selection division 5 initializes all the selection symbol columns of vocabulary storage division 6 and writes a blank symbol in the selection symbol columns of all the vocabulary.

Thereafter, vocabulary selection division 5 reads the first vocabulary of vocabulary storage division 6 and transfers it to number-of-characters range generation division 52. For instance, in the example shown in FIG. 3, it reads the first "HARMOINEN" from vocabulary storage division 6. It is assumed that, in number-of-characters range generation division 52, the range of the number of characters estimated when inputting characters corresponding to the character codes in number-of-characters estimation division 3 is recorded in the format shown in FIG. 13.

In the example shown in FIG. 13, it is recorded that if the number of characters of which character code "A" is handwritten is estimated, it is estimated at one character minimum and three characters maximum. Likewise, it is recorded that if the number of characters of which character code "B" is handwritten is estimated, it is estimated at one character minimum and two characters maximum.

While the minimum and maximum numbers of characters in the case of number-of-characters estimation of the character codes shown in FIG. 13 were suitably given by the designer in this embodiment, it is also feasible to check the estimated number of characters of the results acquired by inputting precollected character images in number-of-characters estimation division 3 of the apparatus for rough classification of words of the present invention and determine the minimum and maximum numbers of characters. Also, the range of the estimated number of characters shown in FIG. 13 does not have to be integers. Furthermore, whatever value coefficient G in number-of-characters estimation division 3 may have, the range of the number of characters should be determined accordingly, and there will be no essential change in the present invention.

On reading the k-th vocabulary, number-of-characters range generation division 52 checks the minimum value of the estimated number of characters in each individual character code of the vocabulary and acquires the sum total thereof, which will be taken as minimum value M1 (k) of the estimate of the number of characters of the vocabulary. However, k represents a vocabulary number. Likewise, it checks the maximum value of the estimated number of characters in each individual character code of the vocabulary and acquires the sum total of them, which will be taken as maximum value M2 (k) of the estimate of the number of characters of the vocabulary. Number-of-characters range generation division 52 transfers the minimum and maximum values of the estimated number of characters of the vocabulary to number-of-characters verification division 51.

Number-of-characters verification division 51 compares the received minimum value M1 (k) and maximum value M2 (k) with the estimated number of characters of the entire word image received from number-of-characters estimation division 3. If the estimated number of characters of the entire word image is , it determines that the number of characters is consistent if the following expression is met.

$$M1(k) <= L <= M2(k) \qquad (5)$$

However, x<=y signifies that x is equal to or less than y.

If number-of-characters verification division 51 determines that the k-th vocabulary in vocabulary storage division 6 is consistent as to the number of characters, it enters a "+" symbol signifying that it is being selected in the vocabulary selection symbol part of the k-th vocabulary in vocabulary storage division 6. Also, if the k-th vocabulary does not meet the expression (5), number-of-characters verification division 51 enters a symbol signifying that it is rejected in the vocabulary selection symbol part of the k-th vocabulary in vocabulary storage division 6.

Number-of-characters verification division 51 performs the above verification of the number of characters of the entire word image as to all the vocabulary in vocabulary storage division 6, and it enters a "+" or "−" symbol in all the vocabulary columns of the vocabulary selection symbol part in vocabulary storage division 6. While the above explained the cases where number-of-characters estimation division 3 outputs a single estimated number of characters, if number-of-characters estimation division 3 outputs two or more estimated numbers of characters, it is possible to check these values separately against the expression (5), and if at least one of the plurality of estimated numbers of characters is consistent, it can be determined that the vocabulary is consistent as to the number of characters. In addition, as another embodiment, only in the case that all of the plurality of estimated numbers of characters meet the expression (5), it can be determined that the vocabulary is consistent as to the number of characters.

If state transition verification division 53 is started, it receives word description generated in word description division 4 as shown in FIG. 6. Also, state transition verification division 53 sequentially reads vocabulary that have a "+" symbol entered in the selection symbol part in vocabulary storage division 6 to verify that the word description is consistent with the read vocabulary.

Next, a case where the k-th vocabulary is read to be checked against word description is described. State transition verification division 53 sets the state at "S" in advance, and reads the first character code of the k-th vocabulary to check against the check character of state 1 of word description.

If any check character matches in this check, it changes the state to "1" and stores (0, (1, 1)) in the next state history set. In the next state history set, the first "0" signifies that penalty is "0," and the next (1, 1) indicates that state "1" was repeated once.

Moreover, in the case that no check character matches in this check, it sets penalty at "1" and changes the state to "1," and then stores (1, (1, 1)) in the next state history set. In the next state history set, the first "1" signifies that penalty is "1," and the next (1, 1) indicates that state "1" was repeated once.

If the check character is "*," it indicates that it can correspond to all the character codes. Anything else indicates that it corresponds only to the same character code. Lastly, state transition verification division 53 assigns the next state history set to the state history set. Next, a case where the i-th character code of the k-th vocabulary is checked is described. State transition verification division 53 takes out one state history from a state history set generated when checking the i-th—1st character code.

It is assumed that the state history is (t, (1, r1), (2, r2), ..., (p−1, r (p−1)), (p, rp)). It shows that penalty is "t," state "1" is repeated r1 times, state "2" is repeated r2 times, and state "3" to state "p−2" likewise on its way, state number "p−1" is repeated r(p−1) times, and state number "p" is repeated rp times leading to the current state.

State transition verification division 53 takes out the next state number of state number "p," and compares the check characters of which state number is the next state number with the i-th character code. If any of the check characters matches with the i-th character code, state transition verification division 53 compares the next state number with state number "p," and then if the next state number matches with the state number, it adds "1" to the number of repetitions of state number "p" of the state history to generate a new state history and record it in the next state history set.

If any of the check characters of the next state number matches with the i-th character code and the next state number does not match with the state number, state transition verification division 53 generates a new state history by adding a set of (next state number, 1) to the state history, and records it in the next state history set.

If a check character of the next state number does not match with the i-th character code, state transition verification division 53 corrects the penalty value of the state history to "t+1," and if the value does not exceed the second threshold, and besides, if the next state number matches with the state number, it adds "1" to the number of repetitions of state number "p" and generates a new state history and records it in the next state history set.

Moreover, if the corrected penalty value does not exceed the second threshold, and besides, if the next state number does not match with the state number, state transition verification division 53 generates a new state history by adding a set of (next state number, 1) to the state history, and records it in the next state history set. If the corrected penalty value is equal to or exceeds the second threshold, state transition verification division 53 does not generate a new state history. While the second threshold is "2" in this embodiment, it may be any value.

State transition verification division 53 performs by a state number the above-mentioned check of the check characters against the i-th character code and creation of a new state history for all the next state numbers of state number "p." Moreover, state transition verification division 53 selects a state number that has the largest number in each individual state history as to all the state histories belonging to a state history set, and by the same procedure as above, it performs, by the next state number of the state number, the above-mentioned check of the check characters against the i-th character code, creation of a new state history and addition to the next state history.

After performing the above process for all the state histories in the state set, state transition verification division 53 performs the process of assigning the generated next state history set to the state history set and then checking the i-th+1st character code of the k-th vocabulary. This process is the same as the above process of checking the i-th character code. In the case that the k-th vocabulary comprises J characters, state transition verification division 53 checks the J-th character code and then further updates the state history set by using a symbol signifying "end of a word," checks the state history set and selects a state history including final state "E" as the state history.

If state transition verification division 53 could detect a state history including state "E," it determines that the vocabulary is consistent with word description and transfers the state history with its number to the candidate character separation number-of-characters verification division. If state transition verification division 53 could not detect a state history including state "E," it rejects the k-th vocabulary. State transition verification division 53 performs the above-mentioned process of checking the k-th vocabulary against word description for all the vocabulary which has "+" in the selection symbol part in vocabulary storage division 6.

Candidate character separation number-of-characters verification division 54 receives and stores word description generated from a word image inputted from input terminal 101. As mentioned above, in one embodiment of the present invention, word description is represented, for instance, in the format shown in FIG. 6. If state histories of vocabulary checked in state transition verification division 53 and determined as consistent are transferred with the vocabulary numbers, they are received by the candidate character separation number-of-characters verification division.

Hereafter, operation in the candidate character separation number-of-characters verification division when it received a set of a state history and a vocabulary number is described. If the candidate character separation number-of-characters verification division transfers a vocabulary number to vocabulary storage division 6, vocabulary of the vocabulary number is transferred from vocabulary storage division 6. In addition, the candidate character separation number-of-characters verification division determines which character code in the vocabulary each state number of state histories corresponds to.

This procedure assigns the state numbers by number of repetitions from the leading character code of the vocabulary in increasing order of state numbers in a state history. For instance, if the vocabulary number is "1" and it is "HARMOINEN" shown in FIG. 3 and the state history is (0, (1, 2), (2, 1), (3, 4), (4, 1), (5, 1)), state numbers are allocated to the nine character codes respectively, representing "112333345." Thus, a set of character codes in the vocabulary corresponding to state number "1" are acquired.

Likewise, the sets of character codes in the vocabulary corresponding to state numbers "2," "3," "4," and "5" are acquired. In the above example, a set of character codes corresponding to state number "3" are the fourth to seventh character codes in the vocabulary, which is "MOIN."

After acquiring a set of character codes corresponding to the state numbers in the state histories, candidate character separation number-of-characters verification division 54 performs the following process for odd state numbers. Now, if the state number is "w," it transfers the character codes of the set of character codes corresponding to the state number to number-of-characters range generation division 52.

As explained in number-of-characters verification division 51, in number-of-characters range generation division 52, the range of the number of characters estimated when inputting characters corresponding to the character codes in number-of-characters estimation division 3 is recorded in the format shown in FIG. 13. As for the set of character codes transferred from candidate character separation number-of-characters verification division 54, number-of-characters range generation division 52 checks the minimum value of the estimated number of characters in each individual character code included therein and acquires sum total of them, which will be taken as minimum value M1 (w) of the estimate of the number of characters of the set of character codes. However, "w" is a state number corresponding to the set of character codes.

Likewise, number-of-characters range generation division 52 checks the maximum value of the estimated number of characters in each individual character code of the set of character codes and acquires the sum total of them, which will be taken as maximum value M2 (w) of the estimate of the number of characters of the set of character codes. The minimum value M1 (w) and the maximum value M2 (w) of the estimated number of characters of the set of character codes are transferred to the candidate character separation number-of-characters verification division.

Candidate character separation number-of-characters verification division 54 compares the received minimum value M1 (w) and maximum value M2 (w) of the estimated number of characters with the number of repetitions of state number "w" listed in the word description received from word description division 4. In the case that the number of repetitions of state number "w" is L (w), it determines that the number of characters is consistent if the following expression is met.

$$M1(w) <= L(w) <= M2(w) \tag{6}$$

However, x<=y signifies that x is equal to or less than y. If the expression (6) is not met, state number "w" does not meet the number-of-characters condition and it rejects the state history.

If the condition of the above expression (6) is met for all the odd "w" s as to the estimated number of characters of the above set of character codes and the number of repetitions in the word description, it determines that the state history is consistent, and outputs from output terminal 102 the vocabulary corresponding to the vocabulary number transferred as a set with the state history from state transition verification division 53. The candidate character separation number-of-characters verification division repeatedly performs the above process for all the state histories transferred from state transition verification division 53.

Figure 14:
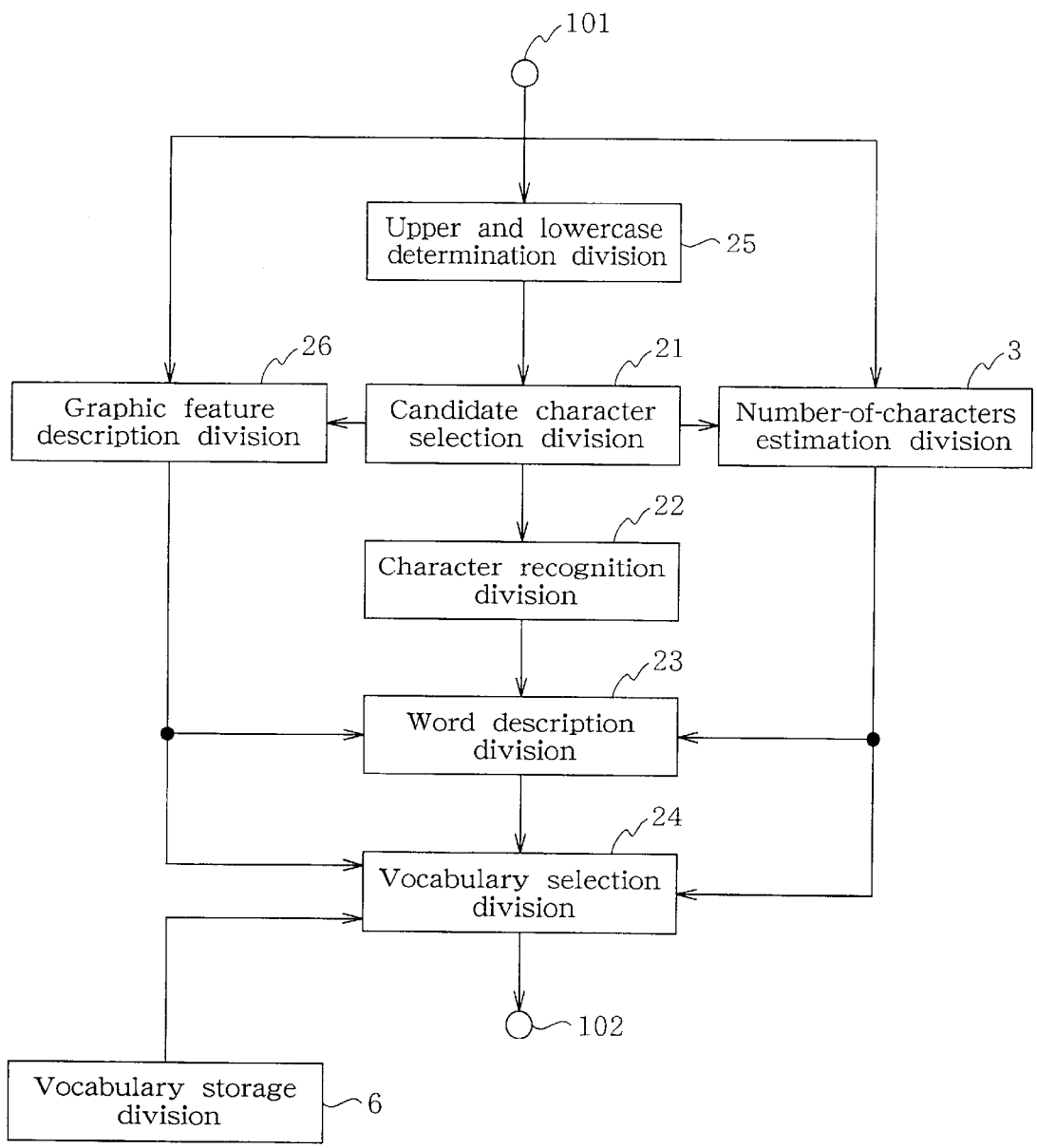
FIG. 14 is a block diagram showing configuration of an apparatus for rough classification of words according to another embodiment of the present invention.
Figures 15, 16:
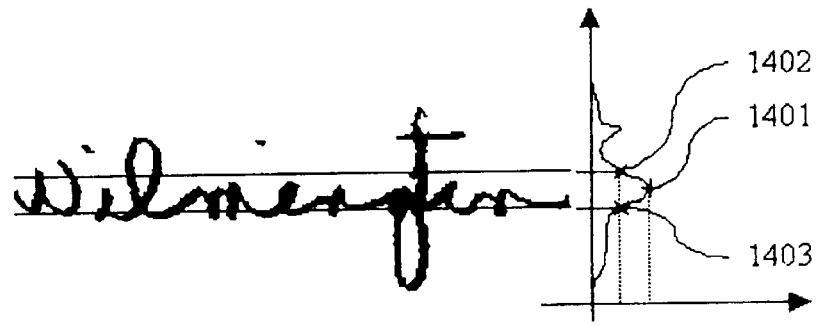
FIG. 15 is a drawing showing an example of a histogram seeking upper and lower baselines of a word image in an apparatus for rough classification of words according to another embodiment of the present invention.
FIG. 16 is a diagram showing examples of word description generated from a word image.

FIG. 14 is a block diagram showing configuration of an apparatus for rough classification of words according to another embodiment of the present invention, and FIG. 15 is a drawing showing an example of a histogram seeking upper and lower baselines of a word image in an apparatus for rough classification of words according to another embodiment of the present invention. In FIG. 14, an apparatus for rough classification of words according to another embodiment of the present invention comprises upper and lowercase determination division 25, candidate character selection division 21, character recognition division 22, number-of-characters estimation division 3, graphic feature description division 26, word description division 23, vocabulary selection division 24 and vocabulary storage division 6.

Upper and lowercase determination division 25 determines whether a word image inputted from input terminal 101 comprises only uppercase characters or includes lowercase characters. Candidate character selection division 21 selects candidate characters from the word image. Character recognition division 22 recognizes the candidate characters selected in candidate character selection division 21. Number-of-characters estimation division 3 estimates the number of characters included in the entire word image and candidate character separations.

Graphic feature description division 26 describes image features included in the entire word image and candidate character separations. Word description division 23 describes a word image from recognition results of candidate characters, estimated number of characters of candidate character separations and graphic features of candidate character separations. Vocabulary selection division 24 selects vocabulary based on the estimated number of characters of the entire word image generated in number-of-characters estimation division 3, the graphic features of the entire word image generated in graphic feature description division 26, and the word description generated in word description division 23. Vocabulary storage division 6 stores vocabulary.

A word image inputted from input terminal 101 is transferred to number-of-characters estimation division 3, upper and lowercase determination division 25 and graphic feature description division 26. Upper and lowercase determination division 25 generates a histogram, as shown in FIG. 15, by counting the number of black pixels of the image in the direction of the x-axis, that is, in the horizontal direction in FIG. 15.

Moreover, upper and lowercase determination division 25 detects the point taking the maximum value of the histogram. In the example shown in FIG. 15, the maximum value point of the histogram is indicated by 1401. Furthermore, upper and lowercase determination division 25 searches for, upward from the point taking the maximum value, a point having a histogram value that is below a half of the maximum value for the first time so as to detect it as an upper benchmark. In the example shown in FIG. 15, the point is indicated by upper benchmark 1402.

Furthermore, upper and lowercase determination division 25 takes as an upper baseline a horizontal line that takes the point as its y-axis coordinate. Just as above, upper and lowercase determination division 25 searches for, starting from the point for taking the maximum value, a point that is below a half of the maximum value for the first time so as to detect it as a lower benchmark. In the example shown in FIG. 15, the point is indicated by lower benchmark 1403.

Upper and lowercase determination division 25 acquires the sum of the sum total of histogram values higher than upper benchmark 1402 and the sum total of histogram values lower than lower benchmark 1403, and compares the value acquired by dividing it by the sum total of the all the histogram values with a third threshold, and if smaller than the third threshold, it determines that the word image is a word comprising only uppercase characters.

If it is not smaller than the third threshold, upper and lowercase determination division 25 determines that the word image is a word comprising a mixture of uppercase and lowercase characters. Upper and lowercase determination division 25 transfers the determination results to candidate character selection division 21. While the third threshold is 0.1 in this embodiment, this value is not essential and may be any value.

Candidate character selection division 21 performs operation almost equivalent to candidate character selection division 1 shown in FIG. 1. However, in the case that upper and lowercase determination division 25 has determined as comprising a mixture of uppercase and lowercase characters, it performs the process of square feature extraction division 12 to any square part image generated by cutting a candidate character separation image in addition to the candidate characters selected from the squares generated by using concatenated square detection division 11 in candidate character selection division 1 shown in FIG. 1, and uses the features generated in the process so as to select them in square selection division 13 and take them as candidate characters.

In this case, candidate character selection division 21 takes as candidate characters the candidate characters selected from the concatenated square that were acquired earlier and also the candidate characters later generated by cutting, and transfers them to character recognition division 22 and number-of-characters estimation division 3. As for a method for cutting a candidate character separation image in this embodiment, the method described from the right column of p.785 to line 2 of the left column of p.787 of "F. Kimura, S. Tsuruoka, Y. Miyake, and M. Shridhar, "A exicon Directed Algorithm for Recognition of Unconstrained Handwritten Words," vol. E77-D, No.7, July 1994, pp.785–793, English paper journal of [Society of Electronic Information and Communication] may be used."

In the case that upper and lowercase determination division 25 has determined as comprising only uppercase, candidate character selection division 21 performs the same operation as candidate character selection division 1 shown in FIG. 1. A set of candidate characters generated in candidate character selection division 21 is transferred to character recognition division 22, number-of-characters estimation division 3 and graphic feature description division 26.

While character recognition division 22 also has the same configuration and performs the same operation as character recognition division 2 shown in FIG. 1, in the case that the determination of upper and lowercase determination division 25 resulted in only uppercase, it recognizes characters by limiting the character type only to uppercase, and in the case that the determination resulted in a mixture of uppercase and lowercase, it recognized characters by targeting all the character types combining uppercase and lowercase.

Number-of-characters estimation division 3 performs exactly the same operation as number-of-characters estimation division 3 explained in FIG. 1 and FIG. 9, and it estimates the number of characters of the entire word image inputted from input terminal 101 and transfers it to vocabulary selection division 24, and besides, it estimates the number of characters in the local areas of candidate character separations generated in candidate character selection division 21, the number of characters of the local area between the left end of the word image and the left end of the leftmost candidate character, and the number of characters of the local area between the right end of the word image and the right end of the rightmost candidate character, and transfers them to word description division 23.

Graphic feature description division 26 detects the numbers of ascenders, descenders and loops from the entire word image inputted from input terminal 101, and transfers them to vocabulary selection division 24. In this embodiment, as explained in the example shown in FIG. 15, ascenders are detected by counting the number of concatenated areas in the portions higher than the upper baseline detected in upper and lowercase determination division 25. The method of detecting concatenated areas is the same as that explained in candidate character selection division 1.

Moreover, the numbers of descenders is acquired by counting the number of concatenated areas in the portions lower than the lower baseline detected in upper and lowercase determination division 25. The number of loops is detected as concatenated white pixel areas surrounded by concatenated black pixels. Graphic feature description division 26 counts the numbers of ascenders, descenders and loops acquired as above, and transfers them to vocabulary selection division 24 as graphic features.

In addition, graphic feature description division 26 receives a set of a right end and left end coordinates of the candidate characters from candidate character selection division 21, and by the same function as area setting division 32 of number-of-characters estimation division 3, acquires as a set of neighboring candidate characters any local area surrounded by the right end of the left candidate and the left end of the right candidate, any local area surrounded by the left end of the word image and the left end of the leftmost candidate character, and any local area surrounded by the right end of the word image and the right end of the rightmost candidate character respectively so as to determine them as candidate character separation areas.

Furthermore, graphic feature description division 26 takes out an image of a candidate character separation areas and counts the numbers of ascenders, descenders and loops of the areas by the same method as mentioned above, and then transfers them together with the area numbers to word description division 23.

Operation of word description division 23 is almost the same as that of word description division 4 explained by FIG. 1, FIG. 10 and FIG. 11. The only difference is the operation of state transition graph generation division 43 shown in FIG. 11 that, when setting the number of repetitions in the areas between candidate characters in step S30, it records the graphic features detected in the same candidate character separation area in word description. Likewise, also in step S33, when setting number of repetitions of the candidate characters in the candidate character separation areas, it records the graphic features detected in the same candidate character separation area in word description.

FIG. 16 shows examples of word description thus generated. It is described as graphic features "1, 2 and 3" that the numbers of ascenders, descenders and loops detected in the areas between candidate characters corresponding to state number "1" are "1," "2," and "3" respectively. Likewise, in the state numbers "3," "5, " and "7," the graphic features are also described in order of ascenders, descenders and loops.

Figure 17:
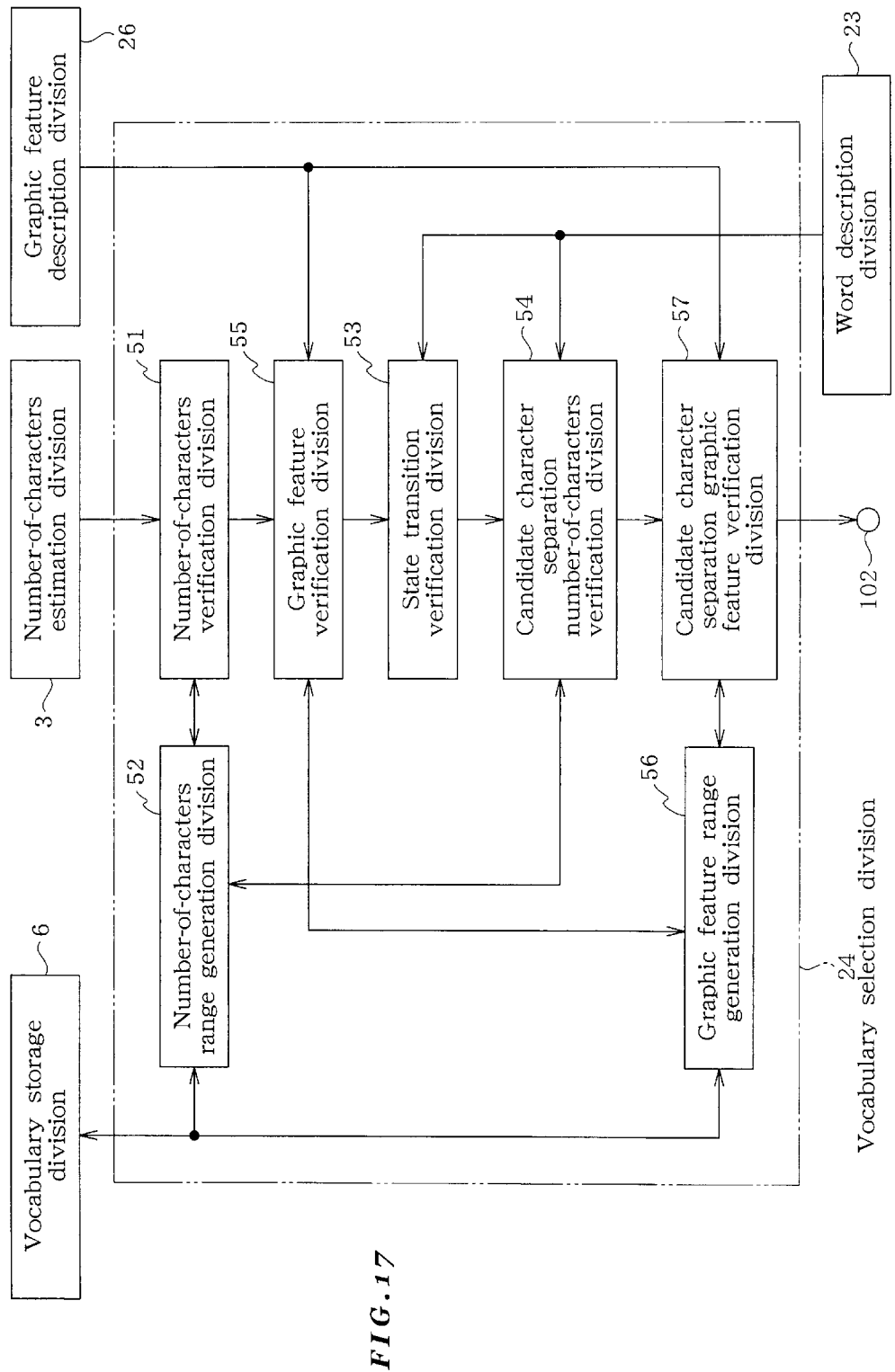
FIG. 17 is a block diagram showing detailed configuration of the vocabulary selection division of FIG. 14.
Figure 19:
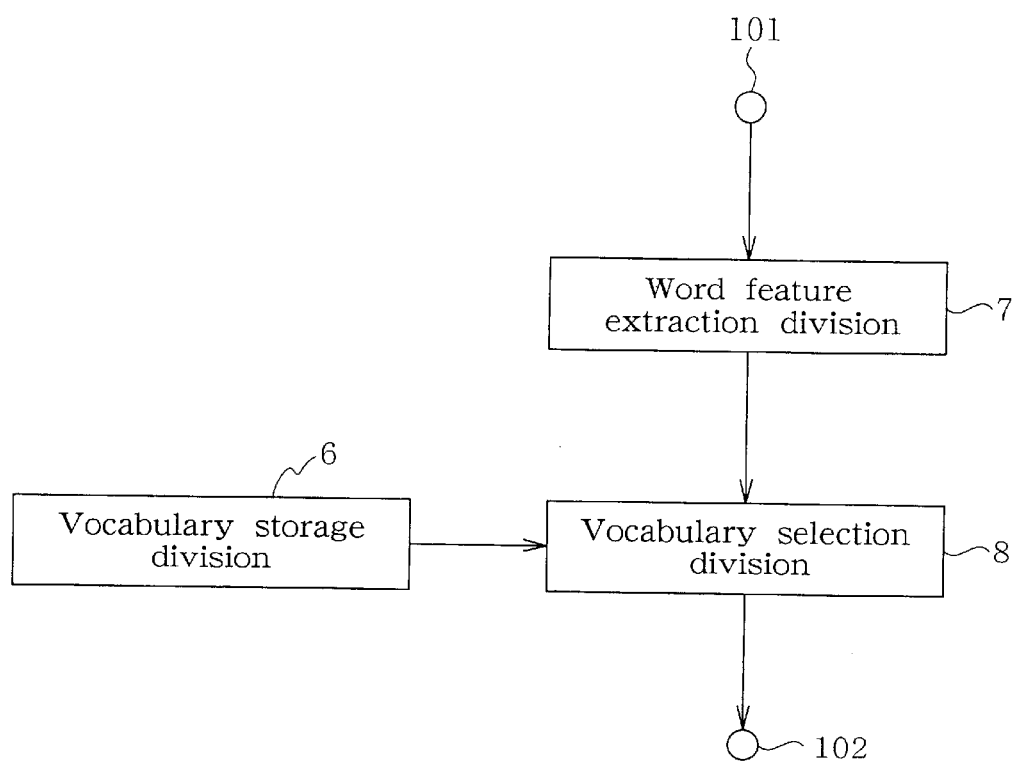
FIG. 19 is a block diagram showing configuration of the conventional apparatus for rough classification of words.

FIG. 17 is a block diagram showing detailed configuration of vocabulary selection division 24 of FIG. 14, and FIG. 18 is a drawing showing an example of a table storing a range of graphic features for each individual character code in the graphic feature range generation division of FIG. 17. These FIG. 14, FIG. 17 and FIG. 18 are used to describe operation of vocabulary selection division 24.

In FIG. 17, vocabulary selection division 24 comprises number-of-characters verification division 51, graphic feature verification division 55, number-of-characters range generation division 52, state transition verification division 53 and candidate character separation number-of-characters verification division, candidate character separation graphic feature verification division 57 and graphic feature range generation division 56.

If the estimated number of characters of the entire word image is transferred from number-of-characters estimation division 3, vocabulary selection division 24 stores the estimated number in the number-of-characters verification division 51 and sequentially reads vocabulary one by one from vocabulary storage division 6 to verify that the number of characters of each individual vocabulary is consistent with the estimated number of characters.

Operation of number-of-characters verification division 51 is the same as that of number-of-characters verification division 51 explained by using FIG. 12. For instance, a case where vocabulary is stored in the format shown in FIG. 3 in vocabulary storage division 6 is described.

Immediately after startup, vocabulary selection division 24 initializes all the selection symbol columns of vocabulary storage division 6 and writes a blank symbol in the selection symbol columns of all the vocabulary. Number-of-characters verification division 51 sequentially reads vocabulary from vocabulary storage division 6, acquires the maximum and minimum values of the estimated number of characters from the character codes comprising the vocabulary via number-of-characters range generation division 52, and compares the estimated number of characters acquired from the entire word image transferred from number-of-characters estimation division 3 with the maximum and minimum values.

If the estimated number of characters is between the maximum and minimum values, number-of-characters verification division 51 enters "+" in the selection symbol column of the vocabulary in vocabulary storage division 6, and if the estimated number is not between the maximum and minimum values, it enters "−" in the selection symbol column of the vocabulary in vocabulary storage division 6. Number-of-characters verification division 51 performs the above process to all the vocabulary of vocabulary storage division 6.

If a graphic feature extracted from the entire word image is inputted from graphic feature description division 26, vocabulary selection division 24 stores that graphic feature in graphic feature verification division 55. If vocabulary with "+" entered in the selection symbol column is sequentially read from vocabulary storage division 6, graphic feature verification division 55 verifies that the graphic features of the vocabulary are consistent with those extracted from the word image.

One vocabulary is read and transferred from vocabulary storage division 6 to graphic feature range generation division 56. In graphic feature range generation division 56, a range of a graphic feature of a character corresponding to each individual character code is recorded in the format shown in FIG. 18. For instance, in the example shown in FIG. 18, it is indicated that the number of ascenders extracted from character code "a" is "1" maximum and "0" minimum, that of descenders is "0," and that of loops is "1" maximum and "0" minimum. While the maximum and minimum values of a graphic feature acquired by inputting a plurality of character patterns in graphic feature description division 26 are recorded as these concrete values in this embodiment, they may be determined by any method.

Graphic feature range generation division 56 reads all the maximum values of the number of ascenders of character codes included in the inputted vocabulary and acquires their sum total, and takes it as the maximum value of the number of ascenders of the vocabulary. Likewise, graphic feature range generation division 56 acquires the minimum value of the number of ascenders, the maximum and minimum values of the number of decenders, and the maximum and minimum values of the number of loops respectively, and transfers them to graphic feature verification division Graphic feature verification division 55 compares the number of ascenders of the entire word inputted from graphic feature description division 26 with the maximum and minimum values of the number of ascenders inputted from graphic feature range generation division 56, and if the number of ascenders of the entire word is not between the maximum and minimum values, it enters "−" in the selection symbol column of the vocabulary in vocabulary storage division 6.

Also, graphic feature verification division 55 compares the number of descenders of the entire word inputted from graphic feature description division 26 with the maximum and minimum values of the number of descenders inputted from graphic feature range generation division 56, and if the number of descenders of the entire word is not between the maximum and minimum values, it enters "−" in the selection symbol column of the vocabulary in vocabulary storage division 6.

Furthermore, graphic feature verification division 55 compares the number of loops of the entire word inputted from graphic feature description division 26 with the maximum and minimum values of the number of loops inputted from graphic feature range generation division 56, and if the number of loops of the entire word is not between the maximum and minimum values, it enters "−" in the selection symbol column of the vocabulary in vocabulary storage division 6. Graphic feature verification division 55 performs the above-mentioned procedure for all the vocabulary with a "+" entered in the selection symbol column in vocabulary storage division 6.

Once started, state transition verification division 53 is the same as state transition verification division 53 in FIG. 12, and inputs word description generated in word description division 23 and verifies that all the vocabulary with "+" entered in the selection symbol column in vocabulary storage division 6 are consistent with the word description. If rejected without a check against the word description, state transition verification division 53 enters "−" in the selection symbol column of the vocabulary in vocabulary storage division 6.

Once started, candidate character separation number-of-characters verification division 54 performs the same operation as candidate character separation number-of-characters verification division 54 in FIG. 12. The candidate character separation number-of-characters verification division acquires a plurality of character codes corresponding to the odd states in the word description generated in word description division 23 for each individual state history transferred from state transition verification division 53, and generates a range of the estimated number of characters in the case of estimating the number of characters of the plurality of character codes in number-of-characters range generation division 52, and verifies that the number of repetitions of check characters in the corresponding portions described in the word description is in the range of the estimated number of characters.

If the number of repetitions of check characters is not in the range of the estimated number of characters, candidate character separation number-of-characters verification division 54 rejects the state history. If, as for one state history, the number of repetitions of check characters of all the candidate character separations is in the range of the estimated number of characters acquired from the corresponding plurality of character codes, candidate character separation number-of-characters verification division 54 determines that the state history is consistent as to the number of characters, and transfers it to candidate character separation graphic feature verification division 57.

The state history of the vocabulary determined as consistent as to the number of characters is transferred with its vocabulary number from candidate character separation number-of-characters verification division to candidate character separation graphic feature verification division 57.

Hereafter, operation of candidate character separation graphic feature verification division 57 in the case of having received a set of state histories and vocabulary numbers in the division is described. First, candidate character separation graphic feature verification division 57 transfers the vocabulary numbers to vocabulary storage division 6 via graphic feature range generation division 56, and transfers the vocabulary of the vocabulary numbers from vocabulary storage division 6.

Also, candidate character separation graphic feature verification division 57 determines which character code in the vocabulary each individual state number of the state histories corresponds to. The procedure is to assign the state numbers by the number of repetitions of a state number from the leading character code of the vocabulary in increasing order of state numbers.

For instance, if the vocabulary number is "1," namely "HARMOINEN" shown in FIG. 3, and the state history is (0, (1, 2), (2, 1), (3, 4), (4, 1), (5, 1)), state numbers are allocated to the nine character codes respectively, representing "112333345." Thus, a set of character codes in the vocabulary corresponding to state number "1" is acquired.

Likewise, the sets of character codes in the vocabulary corresponding to state numbers "2," "3," "4," and "5" respectively are acquired. In the above example, a set of character codes corresponding to state number "3" are the fourth to seventh character codes in the vocabulary, which is "MOIN."

After acquiring a set of character codes corresponding to the state numbers in the above state histories, candidate character separation graphic feature verification division 57 sequentially performs the following process for odd state numbers.

Now, if the state number is "w," candidate character separation graphic feature verification division 57 transfers the character codes of the set of character codes corresponding to the state number to graphic feature range generation division 56. In graphic feature range generation division 56, a range of graphic features estimated when inputting the characters corresponding to the character codes in graphic feature description division 26 is recorded in the format shown in FIG. 18.

As for a set of character codes transferred from candidate character separation graphic feature verification division 57, graphic feature range generation division 56 checks the minimum value of the number of ascenders of each individual character code included in it and acquires their sum total, and takes it as the minimum value M11 (w) of the number of ascenders in the set of character codes. However, w is a state number corresponding to the set of character codes. Likewise, graphic feature range generation division 56 checks the maximum value of the number of ascenders of each individual character code of the set of character codes and acquires their sum total, and takes it as the maximum value M12 (w) of the number of ascenders in the set of character codes.

Furthermore, likewise, graphic feature range generation division 56 acquires the minimum value M21 (w) of the number of descenders of the set of character codes, the maximum value M22 (w) of the number of descenders, the minimum value M31 (w) of the number of loops, and the maximum value M32 (w) of the number of loops. Graphic feature range generation division 56 transfers the minimum values M11 (w), M21 (w) and M31 (w) and the maximum values M12 (w), M22 (w) and M32 (w) of the graphic features of the set of character codes to candidate character separation graphic feature verification division 57.

Candidate character separation graphic feature verification division 57 compares the received minimum values M11 (w), M21 (w) and M31 "w" and the maximum values M12 (w), M22 (w) and M32 (w) of the graphic features with the graphic features of state number (w) described in the word description received from word description division 23.

If the numbers of ascenders, descenders and loops of state number w are L1 (w), L2 (w) and L3 (w) respectively, it determines that it is consistent as to the graphic features if the following expression is met.

$$M11(w)<=L1(w)<=M12(w) \text{ and } M21(w)<=L2(w)<=M22 \text{ and } M31(w)<=L3(w)<=M32(w) \quad (7)$$

However, x<=y signifies that x is equal to or less than y. If the expression (7) is not met, state number "w" does not meet the graphic feature verification condition and it rejects the state history.

If the condition of the above expression (7) is met for all the odd "w"s as to the graphic features of the above set of character codes and the graphic features in the word description, it determines that the state history is consistent, and outputs from output terminal 102 the vocabulary corresponding to the vocabulary number transferred as a set with the state history from candidate character separation number-of-characters verification division 54. Candidate character separation graphic feature verification division 57 repeatedly performs the above process for all the state histories transferred from candidate character separation number-of-characters verification division 54.

In the above-mentioned one embodiment and other embodiments of the present invention, while examples of classifying a given image area into any of the alphabet by targeting the alphabet in character recognition divisions 2 and 22 were used for explanation, the present invention does not limit the target characters for character recognition divisions 2 and 22 to the alphabet, and the composition and effects of the present invention will not change even in the case of the Japanese characters and symbols including kanji or predetermined specific symbols other than the alphabet.

Thus, as there are candidate character selection division 1 and 21 and character recognition divisions 2 and 22 so that candidate characters selected as likely characters may be recognized from a word image and the resultant character codes may be checked against those of the vocabulary so as to implement rough classification of words, it is possible to implement rough classification of words by using only character code strings of the vocabulary without extracting graphic features for each individual vocabulary in advance and generating graphic features for all the vocabulary.

Therefore, even when implementing rough classification of words to a large amount of vocabulary, it can be implemented without collecting word images of all the vocabulary. Also, compared with the cases of recognizing all the concatenated squares and cut portions, it is possible to implement rough classification of words at high speed since only preselected candidate characters are recognized, and precision of the rough classification of words will not be reduced by unnecessary recognition results.

Moreover, as there is number-of-characters range generation division 52 in number-of-characters estimation division 3 and vocabulary selection division 5 and 24 to compare the range of the estimated number of characters predetermined for each of the character codes with the number of characters estimated from a word image so as to perform word selection and implement rough classification of words, it is not necessary to acquire the estimated number of characters directly from the word image and determine and store the range of the estimated number of characters for each individual vocabulary. Thus, it is possible to implement rough classification of words of all the vocabulary without having word images of all the vocabulary.

Furthermore, as there is graphic feature range generation division 56 in graphic feature description division 26 and vocabulary selection division 24 to compare the range of the image feature values predetermined for each of the character codes with the image feature values estimated from a word image so as to perform word selection and implement rough classification of words, it is not necessary to acquire the estimated graphic features directly from the word image and determine and store the range of the image feature values for each individual vocabulary. Thus, it is possible to implement rough classification of words of all the vocabulary without having word images of all the vocabulary.

DETAILED DESCRIPTION OF THE PREFERRED EMBODIMENTS

As explained above, the present invention has the effect of being able to, in an apparatus for rough classification of words for inputting a word image and selecting vocabulary similar to it among the vocabulary stored in a vocabulary storage device in advance, of the word image, select candidate characters that are image areas conforming to predetermined conditions, convert the selected image areas into character codes, generate word description representing the word image by using the converted character codes, and check the generated word description against the vocabulary recorded in the vocabulary storage device so as to select and output vocabulary that can be consistently checked so that features of the words to be stored in a vocabulary storage device can be generated from character codes of the words and thus the words can be efficiently selected.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application (Publication) No. 11-363744 (Filed on Dec. 22, 1999) including specification, claims, drawings and summary are incorporated herein by reference in its entirety.

What is claimed is:

1. An apparatus for rough classification of words for inputting a word image and selecting vocabulary similar to it among the vocabulary stored in a vocabulary storage device in advance, comprising:

a candidate character selecting device for selecting portions of a word image most likely to represent a single character;

a character recognizing device for converting into character codes the image areas selected by said candidate character selecting device;

a word describing device for generating word description representing said word image by using the character codes converted by character recognizing device; and a vocabulary selecting device for checking the word description generated by said word describing device against the vocabulary recorded in said vocabulary storage device so as to select and output vocabulary that can be consistently checked.

2. An apparatus for rough classification of words for inputting a word image and selecting vocabulary similar to it among the vocabulary stored in a vocabulary storage device in advance, comprising:
- a candidate character selecting device for selecting portions of a word image most likely to represent a single character;
- a character recognizing device for converting into character codes the image areas selected by said candidate character selecting device;
- a number-of-characters device for estimating number-of-characters estimating device of said word image in its entirety and estimating the number of characters in the areas generated from said word image;
- a word describing device for generating word description representing said word image by using the character codes converted by said character recognizing device and the number of characters in said areas estimated by said number-of-characters estimating device; and
- a vocabulary selecting device for selecting vocabulary recorded in said vocabulary storage device by using the estimated number of characters of said word in its entirety and checking said word description against the vocabulary recorded in said vocabulary storage device so as to select and output vocabulary that can be consistently checked.

3. The apparatus for rough classification of words according to claim 2, comprising a number-of-characters estimating device for selecting the areas among the candidate characters generated by said candidate character selecting device so as to estimate the number of characters of said areas.

4. The apparatus for rough classification of words according to claim 2, wherein said vocabulary selecting device comprises:
- a number-of-characters range generating device for storing maximum and minimum values of said estimated number of characters for each of said character codes and generating maximum and minimum values of the estimated number of characters of an inputted character code string; and
- a device for checking the maximum and minimum values of the estimated number of characters of said character code string against said word description.

5. The apparatus for rough classification of words according to claim 3, wherein said vocabulary selecting device comprises:
- a number-of-characters range generating device for storing maximum and minimum values of said estimated number of characters for each of said character codes and generating maximum and minimum values of the estimated number of characters of an inputted character code string; and
- a device for checking the maximum and minimum values of the estimated number of characters of said character code string against said word description.

6. An apparatus for rough classification of words for inputting a word image and selecting vocabulary similar to it among the vocabulary stored in a vocabulary storage device in advance, comprising:
- a candidate character selecting device for selecting portions of a word image most likely to represent a single character;
- a character recognizing device for converting into character codes the image areas selected by said candidate character selecting device;
- a number-of-characters estimating device for estimating the number of characters of said word image in its entirety and estimating the number of characters in the areas generated from said entire word image;
- a feature describing device for extracting image features of said word image in its entirety and extracting the image features in the areas generated from said entire word image;
- a word describing device for generating word description representing said word image by using said character codes, the number of characters in said areas and graphic features in said areas; and
- a vocabulary selecting device for using the estimated number of characters and graphic features of said word in its entirety to select the vocabulary recorded in said vocabulary storage device and checking said word description against the vocabulary recorded in said vocabulary storage device so as to select and output vocabulary that can be consistently checked.

7. The apparatus for rough classification of words according to claim 6 comprising:
- a number-of-characters estimating device for selecting areas among candidate characters generated by said candidate character selecting device to estimate the number of characters of the areas: and
- a graphic feature describing device for selecting the areas among candidate characters generated by said candidate character selecting device to extract the graphic features of the areas.

8. The apparatus for rough classification of words according to claim 6, wherein said vocabulary selecting device comprises:
- a number-of-characters range generating device for storing the maximum and minimum values of the estimated number of characters for each of said character codes and generating the maximum and minimum values of the estimated number of characters of an inputted character code string;
- a graphic feature range generating device for storing the maximum and minimum values of graphic features for each of said character codes and generating the maximum and minimum values of graphic features of an inputted character code string; and
- a device for checking the maximum and minimum values of the number of characters of the character code string and the maximum and minimum values of graphic features of the character code string against said word description.

9. The apparatus for rough classification of words according to claim 7, wherein said vocabulary selecting device comprises:
- a number-of-characters range generating device for storing the maximum and minimum values of the estimated number of characters for each of said character codes and generating the maximum and minimum values of the estimated number of characters of an inputted character code string;
- a graphic feature range generating device for storing the maximum and minimum values of graphic features for each of said character codes and generating the maximum and minimum values of graphic features of an inputted character code string; and
- a device for checking the maximum and minimum values of the number of characters of the character code string and the maximum and minimum values of graphic features of the character code string against said word description.

10. An apparatus for rough classification of words for inputting a word image and selecting vocabulary similar to it among the vocabulary stored in a vocabulary storage device in advance, comprising:

a candidate character selecting device for selecting portions of a word image most likely to represent a single character;

an uppercase/lowercase determining device for determining whether said word image comprises only uppercase characters or a mixture of uppercase and lowercase characters;

a character recognizing device for, when determined as comprising only said uppercase characters by said uppercase/lowercase determining device, converting into character codes the image areas selected by limiting the character type only to said uppercase, and when determined as said mixture of uppercase and lowercase characters by said uppercase/lowercase determining device, converting into character codes the image areas selected by targeting all the character types;

a number-of-characters estimating device for estimating the number of characters of said word image in its entirety and estimating the number of characters in the areas generated from said entire word image;

a feature describing device for extracting image features of said word image in its entirety and extracting the image features in the areas generated from said entire word image;

a word describing device for generating word description representing said word image by using said character codes, the number of characters in said areas and graphic features in said areas; and a vocabulary selecting device for using the estimated number of characters and graphic features of said word in its entirety to select the vocabulary recorded in said vocabulary storage device and checking said word description against the vocabulary recorded in said vocabulary storage device so as to select and output vocabulary that can be consistently checked.

11. The apparatus for rough classification of words according to claim 10 comprising:

a number-of-characters estimating device for selecting areas among candidate characters generated by said candidate character selecting device to estimate the number of characters of the areas: and a graphic feature describing device for selecting the areas among candidate characters generated by said candidate character selecting device to extract the graphic features of the areas.

12. The apparatus for rough classification of words according to claim 10, wherein said vocabulary selecting device comprises:

a number-of-characters range generating device for storing the maximum and minimum values of the estimated number of characters for each of said character codes and generating the maximum and minimum values of the estimated number of characters of a inputted character code string;

a graphic feature generating device for storing the maximum and minimum values of graphic features for each of said character codes and generating the maximum and minimum values of graphic features of a inputted character code string; and a device for checking the maximum and minimum values of the number of characters of the character code string and the maximum and minimum values of graphic features of the character code string against said word description.

13. The apparatus for rough classification of words according to claim 11 wherein said vocabulary selecting device comprises:

a number-of-characters range generating device for storing the maximum and minimum values of the estimated number of characters for each of said character codes and generating the maximum and minimum values of the estimated number of characters of a inputted character code string;

a graphic feature generating device for storing the maximum and minimum values of graphic features for each of said character codes and generating the maximum and minimum values of graphic features of a inputted character code string; and a device for checking the maximum and minimum values of the number of characters of the character code string and the maximum and minimum values of graphic features of the character code string against said word description.

14. A method for rough classification of words for inputting a word image and selecting vocabulary similar to it among the vocabulary stored in a vocabulary storage device in advance, comprising the steps of:

selecting portions of a word image most likely to represent a single character;

converting the selected image areas into character codes;

generating word description representing said word image by using the converted character codes; and checking the generated word description against the vocabulary recorded in said vocabulary storage device so as to select and output vocabulary that can be consistently checked.

15. A method for rough classification of words for inputting a word image and selecting vocabulary similar to it among the vocabulary stored in a vocabulary storage device in advance, comprising the steps of:

selecting portions of a word image most likely to represent a single character;

converting the selected portions into character codes;

estimating the number of characters of said word image in its entirety and estimating the number of characters in the areas generated from said word image;

generating word description representing said word image by using the converted character codes and the estimated number of characters in said areas; and using the estimated number of characters of said word in its entirety to select the vocabulary recorded in said vocabulary storage device and checking said word description against the vocabulary recorded in said vocabulary storage device so as to select and output vocabulary that can be consistently checked.

16. The method for rough classification of words according to claim 15, comprising the step of selecting the areas among the candidate characters selected in said step of selecting candidate characters that are image areas to estimate the number of characters of the areas.

17. The method for rough classification of words according to claim 15, wherein said step of selecting and outputting vocabulary that can be consistently checked comprises the steps of:

storing the maximum and minimum values of said estimated number of characters for each of said character codes and generating the maximum and minimum values of the estimated number of characters of an inputted character code string; and checking the maximum and minimum values of the estimated number of characters of said character code string against said word description.

18. The method for rough classification of words according to claim 16, wherein said step of selecting and outputting vocabulary that can be consistently checked comprises the steps of:

storing the maximum and minimum values of said estimated number of characters for each of said character codes and generating the maximum and minimum values of the estimated number of characters of an inputted character code string; and checking the maximum and minimum values of the estimated number of characters of said character code string against said word description.

19. A method for rough classification of words for inputting a word image and selecting vocabulary similar to it among the vocabulary stored in a vocabulary storage device in advance, comprising the steps of:

selecting portions of a word image most likely to represent a single character;

converting the selected image areas into character codes;

estimating the number of characters of said word image in its entirety and estimating the number of characters in the areas generated from said entire word image;

extracting image features of said word image in its entirety and extracting the image features in the areas generated from said entire word image;

generating word description representing said word image by using said character codes, the number of characters in said areas and graphic features in said areas; and using the estimated number of characters and graphic features of said word in its entirety to select the vocabulary recorded in said vocabulary storage device and checking said word description against the vocabulary recorded in said vocabulary storage device so as to select and output vocabulary that can be consistently checked.

20. The method for rough classification of words according to claim 19, comprising the steps of:

selecting areas among candidate characters generated in said step for selecting candidate characters to estimate the number of characters of the areas: and selecting the areas among candidate characters generated by said step of selecting candidate characters to extract the graphic features of the areas.

21. The method for rough classification of words according to claim 19, wherein said step of selecting and outputting vocabulary that can be consistently checked comprises the steps of:

storing the maximum and minimum values of the estimated number of characters for each of said character codes and generating the maximum and minimum values of the estimated number of characters of an inputted character code string;

storing the maximum and minimum values of graphic features for each of said character codes and generating the maximum and minimum values of graphic features of an inputted character code string; and checking the maximum and minimum values of the number of characters of the character code string and the maximum and minimum values of graphic features of the character code string against said word description.

22. The method for rough classification of words according to claim 20, wherein said step of selecting and outputting vocabulary that can be consistently checked comprises the steps of:

storing the maximum and minimum values of the estimated number of characters for each of said character codes and generating the maximum and minimum values of the estimated number of characters of an inputted character code string;

storing the maximum and minimum values of graphic features for each of said character codes and generating the maximum and minimum values of graphic features of an inputted character code string; and checking the maximum and minimum values of the number of characters of the character code string and the maximum and minimum values of graphic features of the character code string against said word description.

23. A method for rough classification of words for inputting a word image and selecting vocabulary similar to it among the vocabulary stored in a vocabulary storage device in advance, comprising the steps of:

selecting potions of a word image most likely to represent a single character;

determining whether said word image comprises only uppercase characters or a mixture of uppercase and lowercase characters;

when determined as comprising only said uppercase characters, converting into character codes the image areas selected by limiting the character type only to said uppercase, and when determined as said mixture of uppercase and lowercase characters, converting into character codes the image areas selected by targeting all the character types;

estimating the number of characters of said word image in its entirety and estimating the number of characters in the areas generated from said entire word image;

extracting image features of said word image in its entirety and extracting the image features in the areas generated from said entire word image;

generating word description representing said word image by using said character codes, the number of characters in said areas and graphic features in said areas; and using the estimated number of characters and graphic features of said word in its entirety to select the vocabulary recorded in said vocabulary storage device and checking said word description against the vocabulary recorded in said vocabulary storage device so as to select and output vocabulary that can be consistently checked.

24. The method for rough classification of words according to claim 23, comprising the steps of:

selecting areas among portions selected in said step of selecting candidate characters to estimate the number of characters of the areas: and selecting the areas among portions selected in said step of selecting candidate characters to extract the graphic features of the areas.

25. The method for rough classification of words according to claim 23, wherein said step of selecting and outputting vocabulary that can be consistently checked comprises the steps of:

storing the maximum and minimum values of the estimated number of characters for each of said character codes and generating the maximum and minimum values of the estimated number of characters of an inputted character code string;

storing the maximum and minimum values of graphic features for each of said character codes and generating the maximum and minimum values of graphic features of an inputted character code string; and checking the maximum and minimum values of the number of characters of the character code string and the maximum and minimum values of graphic features of the character code string against said word description.

26. The method for rough classification of words according to claim 24, wherein said step of selecting and outputting vocabulary that can be consistently checked comprises the steps of:

storing the maximum and minimum values of the estimated number of characters for each of said character codes and generating the maximum and minimum values of the estimated number of characters of an inputted character code string;

storing the maximum and minimum values of graphic features for each of said character codes and generating the maximum and minimum values of graphic features of an inputted character code string; and checking the maximum and minimum values of the number of characters of the character code string and the maximum and minimum values of graphic features of the character code string against said word description.

27. A record medium recording a control program for controlling an apparatus for rough classification of words for inputting a word image and selecting vocabulary similar to it among the vocabulary stored in a vocabulary storage device in advance, wherein said control program causes said apparatus:

to select portions of a word image most likely to represent a single character;

to convert the selected image areas into character codes;

to generate word description representing said word image by using the converted character codes; and to check the generated word description against the vocabulary recorded in said vocabulary storage device so as to select and output vocabulary that can be consistently checked.

28. A record medium recording a control program for controlling an apparatus for rough classification of words for inputting a word image and selecting vocabulary similar to it among the vocabulary stored in a vocabulary storage device in advance, wherein said control program causes said apparatus:

to select portions of a word image most likely to represent a single character;

to convert the selected image areas into character codes;

to estimate the number of characters of said word image in its entirety and estimate the number of characters in the areas generated from said word image;

to generate word description representing said word image by using the converted character codes and the estimated number of characters in said areas; and to use the estimated number of characters of said word in its entirety to select the vocabulary recorded in said vocabulary storage device and to check said word vocabulary storage device so as to select and output vocabulary that can be consistently checked.

29. A record medium recording a control program for controlling an apparatus for rough classification of words for inputting a word image and selecting vocabulary similar to it among the vocabulary stored in a vocabulary storage device in advance, wherein said control program causes said apparatus:

to select portions of a word image most likely to represent a single character;

to estimate the number of characters of said word image in its entirety and estimate the number of characters in the areas generated from said entire word image;

to extract image features of said word image in its entirety and extract the image features in the areas generated from said entire word image;

to generate word description representing said word image by using said character codes, the number of characters in said areas and graphic features in said areas; and to use the estimated number of characters and graphic features of said word in its entirety to select the description against the vocabulary recorded in said vocabulary recorded in said vocabulary storage device and to check said word description against the vocabulary recorded in said vocabulary storage device so as to select and output vocabulary that can be consistently checked.

30. A record medium recording a control program for controlling an apparatus for rough classification of words for inputting a word image and selecting vocabulary similar to it among the vocabulary stored in a vocabulary storage device in advance, wherein said control program causes said apparatus:

to select portions of a word image most likely to represent a single character;

to determine whether said word image comprises only uppercase characters or a mixture of uppercase and lowercase characters; when determined as comprising only said uppercase characters, to convert into character codes the image areas selected by limiting the character type only to said uppercase, and when determined as said mixture of uppercase and lowercase characters, to convert into character codes the image areas selected by targeting all the character types;

to estimate the number of characters of said word image in its entirety and estimate the number of characters in the areas generated from said entire word image;

to extract image features of said word image in its entirety and extract image features in the areas generated from said entire word image;

to generate word description representing said word image by using said character codes, the number of characters in said areas and graphic features in said areas; and to use the estimated number of characters and graphic features of said word in its entirety to select the vocabulary recorded in said vocabulary storage device and to check said word description against the vocabulary recorded in said vocabulary storage device so as to select and output vocabulary that can be consistently checked.

31. A method for rough classification of words for inputting a word image and selecting vocabulary similar to inputted word from the vocabulary stored in a vocabulary storage, the method comprising:

detecting at least one portion of the word image most likely to be a single character;

generating at least one possible character candidate for each of said at least one detected portion;

generating at least one character code for each of said at least one undetected area, the undetected area is a portion of the word that cannot be identified as a single character;

approximating number of characters in the word image;

generating word description representing the word image by using said at least one character candidate and said at least one character code; and checking the generated word description against the vocabulary recorded in said vocabulary storage so as to select vocabulary.

32. The method for rough classification of words according to claim 31, wherein the generated word description is a state transition graph.

33. The method for rough classification of words according to claim 31, wherein the generated word description comprises states for transition in checking the word image against vocabulary, each of said states corresponds to a detected portion from said at least one detected portion or an undetected area from said at least one undetected area.

34. The method for rough classification of words according to claim 33, wherein the generated word description for each of said states stores said at least one candidate character for the corresponding detected portion or said at least one character code for the corresponding undetected area, a value representing number of times said at least one candidate character or said at least one character code can appear in said state and at least one value representing next state.

35. The method for rough classification of words according to claim 31, further comprising estimating number of characters in each of said at least one undetected area.

* * * * *